United States Patent
Lauzon

(10) Patent No.: US 10,010,090 B2
(45) Date of Patent: Jul. 3, 2018

(54) METHOD FOR CONTROLLING MICROBIOLOGICAL CONTAMINATION IN A HEAT EXCHANGER WHILE PROCESSING A FOOD PRODUCT

(71) Applicant: Normand Lauzon, St-Eustache (CA)

(72) Inventor: Normand Lauzon, St-Eustache (CA)

(*) Notice: Subject to any disclaimer, the term of this patent is extended or adjusted under 35 U.S.C. 154(b) by 240 days.

(21) Appl. No.: 14/394,601

(22) PCT Filed: May 23, 2013

(86) PCT No.: PCT/CA2013/000497
§ 371 (c)(1),
(2) Date: Oct. 15, 2014

(87) PCT Pub. No.: WO2013/173908
PCT Pub. Date: Nov. 28, 2013

(65) Prior Publication Data
US 2016/0192669 A1    Jul. 7, 2016

Related U.S. Application Data

(60) Provisional application No. 61/754,796, filed on Jan. 21, 2013, provisional application No. 61/688,846, filed on May 23, 2012.

(51) Int. Cl.
| | |
|---|---|
| *A23C 3/00* | (2006.01) |
| *A23C 3/08* | (2006.01) |
| *A23L 3/18* | (2006.01) |
| *A23C 3/033* | (2006.01) |
| *A23L 3/20* | (2006.01) |

(52) U.S. Cl.
CPC ............... *A23C 3/08* (2013.01); *A23C 3/033* (2013.01); *A23C 3/085* (2013.01); *A23L 3/18* (2013.01); *A23L 3/20* (2013.01)

(58) Field of Classification Search
CPC .......... A23C 3/08; A23C 3/033; A23C 3/085; A23C 3/18; A23C 3/20
USPC ............. 426/330, 330.2, 335, 531, 532, 580
See application file for complete search history.

(56) References Cited

U.S. PATENT DOCUMENTS

| | | | |
|---|---|---|---|
| 4,008,335 A | 2/1977 | Akerman et al. | |
| 5,064,561 A | 11/1991 | Rouillard | |
| 5,266,338 A | 11/1993 | Cascione et al. | |
| 6,878,287 B1 | 4/2005 | Marais | |
| 8,124,132 B2 | 2/2012 | Hilgren et al. | |
| 8,398,781 B2 | 3/2013 | Leon et al. | |
| 2007/0231198 A1* | 10/2007 | Lin ........................ | A01N 25/16 422/28 |
| 2009/0199866 A1 | 8/2009 | Kirkpatrick | |
| 2010/0075006 A1 | 3/2010 | Senenzm | |
| 2011/0236560 A1 | 9/2011 | Perlman | |
| 2012/0180819 A1* | 7/2012 | Lindqvist ................. | A61L 2/18 134/25.1 |

FOREIGN PATENT DOCUMENTS

| | | |
|---|---|---|
| EP | 658312 A | 6/1995 |
| EP | 842255 B1 | 11/1999 |
| EP | 751211 B | 9/2001 |
| EP | 879276 B | 11/2001 |
| GB | 488972 | 7/1938 |
| GB | 1246231 | 9/1971 |
| WO | 2010045686 A | 4/2010 |

\* cited by examiner

Primary Examiner — Leslie A Wong

(57) ABSTRACT

A method for controlling microbiological contamination in a heat exchanger while using the heat exchanger to process a food product. The method includes: while processing the food product in the heat exchanger, adding a microbiological control agent to the food product at a first location; and neutralizing at least partially the microbiological control agent by adding a neutralizing agent to the food product at a second location, the second location being downstream from the first location, at least part of the heat exchanger being between the first and second locations, the neutralizing agent being operative for reducing a chemical reactivity of the microbiological control agent in the food product. The microbiological control agent controls the microbiological contamination in the heat exchanger while the food product is processed. In some embodiments, the food product is a milk product.

36 Claims, 2 Drawing Sheets

METHOD FOR CONTROLLING MICROBIOLOGICAL CONTAMINATION IN A HEAT EXCHANGER WHILE PROCESSING A FOOD PRODUCT

This application is a 371 of PCT/CA2013/000497, filed May 23, 2013.

FIELD OF THE INVENTION

The present invention relates to the general field of food processing and is particularly concerned with a method for controlling microbiological contamination in a heat exchanger while processing a food product. For example, the food product is a milk product.

BACKGROUND

The well known and widely used principle of pasteurization of liquid food products is done in most food industries on a continuous flow basis using plate heat exchangers or tubular heat exchangers or a combination of plate and tubular heat exchangers. That process is also called "HTST" which stands for High Temperature Short Time. It is very important to note and remember in this whole document that pasteurization is not a sterilization process and typically kills from 99% to 99.5% (or slightly more without ever reaching 100%) of the living microorganisms that are present in the raw liquid food product.

EXAMPLE #1

In the production of fermented type products, such as cheese, the raw milk must be pasteurized or thermized (also called heat treated for raw milk based cheese) before going to fermentation process. The following is an example of such process and describes some problems that can be encountered while performing this process.

Raw milk alone, or already blended with some other milk ingredients in some operations, is pumped into a pasteurizer balance tank on a continuous basis. From the pasteurizer balance tank, the milk is pumped into a pasteurizer where it goes through various heat exchange plate sections. At first, the milk goes through the raw regeneration plate section where it is pre heated from 33-39° F. (1-4° C.) to 140-155° F. (60-65° C.), depending on the size and energy exchange efficacy of those regeneration plates. Going through the raw regeneration plate section, the raw milk is heated by the already pasteurized milk (going reverse flow on the other side of each second plate). Then, in some recipes, if the fat level needs to be adjusted, the milk as it comes out of the raw regeneration section is sent through a milk separator where the fat is separated from the milk. In some recipes, some of the fat (cream) might be reinjected into the milk to get a very precise percentage of fat. Also, in some recipes, at the discharge of the separator on the skimmed milk side, some operations will add other milk ingredients such as whey cream, milk protein, whey protein and possibly some other ingredients in order to increase cheese yield. In some other pasteurizer design, the milk is sent to the separator at a lower temperature than the 140-155° F. (60-65° C.) and, after separation, the milk goes to another raw regeneration section to reach the 140-155° F. (60-65° C.) temperature. The milk then comes back into the pasteurizer to go through the heating section where it is heated up to 162° F. (72° C.) or more (but only up to 140-154° F. or 60-68° C. for thermization/or heat treat process). Then, the milk comes out of the heating section and goes through holding tubes that are long enough to maintain that milk flow volume at that same temperature for at least 16 seconds in order to provide the desire killing of microorganisms. At the end of the holding tube routing, the milk reaches an electronic thermometer. If the temperature measured is less than the set temperature of 162° F. (72° C.), the milk is diverted back to the balance tank by going through a flow diversion valve assembly that is being instantly deenergized. If the set temperature of 162° F. (72° C.) is met, the flow diversion valve assembly is not deenergized and the milk, which has now gained the pasteurized status, continues its route to go through the pasteurize regeneration section where it is cooled down, by the raw milk on the other side of the regeneration plates, to 89-100° F. or 32-38° C. (depending on which variety of cheese is being produced). A huge amount of heating and cooling energy is saved by using that heat exchange process to preheat the raw milk with the hot pasteurized milk and at same time cooling the hot pasteurize milk with the cold raw milk. Up to 90% energy recovery or even more is achieved The pasteurized, or thermized/heat treated milk, comes out of the pasteurizer (or thermizer) and is routed to a vat to be filled therewith. Before the milk reaches the vat, at a very precise moment (normally as soon as the vat is filled with a predetermined quantity of milk) a very precise quantity of starter culture is added automatically into the milk flow going to the vat. The starter culture can also be added manually into the vat by a cheese maker once a certain volume of milk has been added into the vat. The starter culture, composed of the desired bacteria to produce the desired type of cheese, initiates the fermentation process of cheese making. The milk can also be fortified with the addition of calcium to balance the formula. The pH of the milk may also be adjusted with the addition of other processing aid products. The temperature of the milk is very important as it is what provides one of the required optimal conditions that the starter culture needs to grow at its optimal rate. The starter culture is composed, for the fabrication of most types of cheeses, of bacteria essentially and among these bacteria there are some species that are categorized as being mesophilic (growing best at temperatures from 69 to 113° F. or 20 to 45° C.) and some others as being thermophilic (growing best at temperature above 113° F. or 45° C.). Most of those bacteria are acid former, which means that they have the ability as they reproduce to transform the lactose (sugar) present in the milk into lactic acid, which causes the pH to drop and consequently causes the protein present in the milk to reach its isoelectric point and coagulate to form cheese (rennet must also be added into the cheese make process to allow the coagulation of the protein to take place).

Problem Encountered with Plate Heat and/or Tubular Pasteurizer in Cheese Making

Some study done more than 20 years ago showed that some living bacteria present in the raw milk and flowing with it into the pipes and plates of a pasteurizer can attach onto the raw regeneration section plates at a location wherein the milk reaches an optimal temperature range for their growth depending on which family they belong to (psychrotrophic from 69° F. to less, mesophilic from 69 to 113° F. and thermophilic above 113° F.). Some other bacteria present in the milk flow do not attach on the raw regeneration plates and instead go through the pasteurization heating section. Some of them, normally in very low number, survive the pasteurization temperature because of their better thermoduric property and come out of the pasteurized heating section to continue their route with the milk flow into the pasteurized cooling section, and then some of them attach themselves on the surface of the plates where again the temperature of the milk reaches their optimal temperature range for growth. In both cases, as those bacteria grow, they also produce biofilms. After a few of hours of production (normally after 10-12 hours, or sometimes less), bacteria populations have reached high number in both regeneration sections raw and pasteurize and start to detach from the surface and get in the milk flow to continue their route into the pasteurizer. The ones from the raw saw side will survive pasteurization temperature in very low number again to either attach on the pasteurized cooling section (at a location where the temperature is at the ideal range for optimal growth) and will start to grow or will go with the milk flow up to the vat. The ones that will detach from the pasteurize cooling section are present in much higher number because they do not go through pasteurization but go the vat being filled. In both cases, at the location on the plates the bacteria grow, they started a lactic acid former fermentation process of the milk (similar to the cheese process) even though the starter culture has not been added yet.

As a result, cheese operators start to see a drop in the pH (a rise of the acidity) of the milk coming into the vat, indicating that the undesired lactic acid bio culture activity is going up. Most of these undesired wild thermophilic and mesophilic bacteria are also known to transform the lactose that is present in the milk into lactic acid, which explains the pH drop just like the ones present in the starter culture as described before. To react to that problem, cheese operators sometimes reduce the amount of starter lactic culture they add per vat. However, doing that creates another problem of stability and quality of cheese with regards to taste, flavor, texture and shelf life. The only real solution to prevent the problem from growing even more is to stop the pasteurization process and make what people call in the industry a short mid day wash, a punch wash or a boil out. This is accomplished by doing first a fresh water rinse to push the milk out of the pasteurizer, followed with the circulation of a one to two percent active caustic based cleaning solution for about 10-30 minutes at 170-190° F. (77-88° C.), followed with a water rinse to push out the caustic cleaning solution and then followed by the reinsertion of milk in the pasteurizer. The loss of production is phenomenal i.e. from 1 up to 3 vats of cheese and sometimes even more per day, all year long in some plants.

The presence of those undesired surviving bacteria in the pasteurized milk has been known for more than 20 years with the tubular or plate pasteurizers, but has become a bigger problem as cheese plants are getting bigger and are requested to produce even more cheese. In the older days, that problem was not as apparent because most cheese manufactures were not requested to produce as many hours in a row to make as much cheese as possible on a daily basis. In addition, the cheese making process didn't include fortification of the milk with the addition of extra protein, fat and calcium, as it is seen today. Fortification of milk started in the 70s in Europe and quite later in America. In today's milk pasteurization, most cheese manufacturers fortify their milk to get the highest possible poundage of cheese per vat (also called yield) and get highest possible profitability. However, having more solids into the milk creates another problem of getting the same pasteurization efficacy (killing efficacy on microorganisms). Having more solids in the product to pasteurize makes the heat transfer through the liquid more difficult as it is being circulated through the pasteurizer plates and pipes. More solids with more minerals means also more precipitation of fat, sugar, protein calcium and other minerals present in the milk, which can conduct to more attachment points for the microorganisms (already present in the raw milk) on the interior surfaces of the plates and/or pipes. The precipitation of those molecules becomes also an excellent nutrient for the attached bacteria to grow.

Also, combined with the increased amount of production demand and fortification of the milk, there has been the development of better pasteurizers in terms of energy recovery with the use of substantially more regeneration plates (raw and pasteurize) and better plate design. The problem with the use of more and more of these plates increases the amount of surface points where bacteria can attach and where the temperature of the milk is within the ideal range for the bacteria to grow. Consequently, more biofilm formation is observed as the population of these undesired surviving attached bacteria is going up (biofilms are produced by bacteria). In addition, biofilms, by covering the attached bacteria, not only protect them from the heat and the contact with cleaning & sanitizing chemicals, but are very difficult to be removed by the widely used cleaning chemical solutions composed of caustic and/or acid.

The better design and increase number of plates also allowed to reduce the Delta T (Temperature differential) of the heating product versus the heated product, which reduced the stress of temperature on the bacteria and, as a consequence, contributed to faster bacterial growth and reproduction.

Some cheese producers try to run their pasteurizer for as long as possible or even make a full production day before cleaning the pasteurizer, even though they know this gives more time for the surviving bacteria to grow and produce more biofilms, which then make the daily cleaning even more difficult. Inversely, making a midday wash can certainly minimize the development of bacteria & biofilms and maintain a better quality of finished product, but the plant then looses on the productivity and profitability sides. Also, the midday wash has significant drawback in terms of environmental impact as it is responsible to increase BOD (Biochemical Oxygen Demand) charges generated by the product losses going with the effluent to the waste water treatment plant. Those product losses are generated when making the transition of going from milk to water and water back to milk. The disposal of the cleaning wash solution also increases COD (Chemical Oxygen Demand) charges because of the disposal of the chemicals that were used. Needless to say that there too, the financial impact is considerable.

Therefore in both cases, actual cleaning methods using caustic cleaning solution followed or not with acid cleaning solution are recognized for not being able to remove entirely those biofilms. The reason why biofilms are difficult to remove by cleaning action is because of their global complexity. Biofilms are made of very complex organic matrix called glycocalyx, which contains large organic complex molecules such as polysaccharides and glycoproteins. Those molecules remain quite stable even when submerged with hot strong cleaning solutions such as caustic and acid based solutions. Or, sometimes, their partial degradation can instead lead to the formation of some polymerized molecules which are even harder to remove. Again, in a lot of cases, biofilms increase in quantity after a few days of production and incomplete washes. Some plants have to do very expensive or even more aggressive wash or soak on a regular basis or when the problem reaches an undesired level. It is very important to remove every day as much biofilm as possible when making the wash.

Overall, the problem of biofilm's presence and accumulation is caused by a combination of several factors which are:

Presence of bacteria in the raw product that can resist pasteurization temperatures (thermoduric).

Incomplete kill of bacteria achieved by pasteurizers (99 to 99.5% killing efficacy or slightly more without never reaching 100%).

Long duration of daily pasteurization (16-20 hours per day) with presence of surviving bacteria that have enough time to attach, adapt, grow, produce biofilms, detach and go in rising number into the milk flow after normally 10-12 hours of pasteurization.

Newest principle and design of plates and/or tubular pasteurizers provides more surfaces to the bacteria to attach where the temperature is at their ideal temperature range for optimal growth.

Lower Delta T between heated product and heating product reduced the temperature stress on the bacteria and give them a more favorable environment to grow.

Molecular complexity of biofilms that protect bacteria against high temperature and/or strong chemical exposures and contact.

Limited cleaning action of the caustic and acid based solutions on the removal of accumulated biofilms.

It is also important to mention that any surviving bacteria once attached on the surface can take some time to adapt to the new condition. The proper conditions must be somehow identified and confirmed by the bacteria first before it starts its reproduction growth cycle.

In conclusion here, there is a need for an improved pasteurization method that will be able to maintain its highest possible killing efficacy on microorganisms by minimizing and preventing bacteria attachment and biofilm formation and accumulation throughout the entire day or at least for more hours

EXAMPLE #2

In the fluid dairy milk industry, in the pasteurization process, milk is heated to 162° F. (72° C.) or more and maintained for at least 16 seconds at that temperature to achieve legal pasteurization and then cooled down to 33-38° F. (1-4° C.) or slightly more and routed and stored into a pasteurized silo, reservoir, tank or vessel before going to a filler for final filling in containers. The problem encountered in the fluid dairy industry is the presence of psychrotrophic bacteria which originates from the raw milk source coming from the dairy farm and which are known to grow best at temperatures less than 69° F. (20° C.). Those bacteria are known to be gram positive, spore former and have good thermoduric property, which means that some of them can resist pasteurization temperature. Bacillus as an example is a bacteria found in the raw milk supply that can resist pasteurization temperatures more likely when in a dormant spore state and more surprisingly can grow, once desporulated, in the pasteurized milk even at low storage temperatures which are normally slightly above freezing point (39° F./4° C. or more). The pasteurization process, due to the fast rise and then fast drop of temperature, gives enough 'stress' to some of the spores without necessarily killing them, which then cause some to desporulate and free up the bacteria from its latent or dormant phase. Therefore, these desporulated bacteria have the ability to grow and reproduce themselves in the contained stored cold milk even at low temperatures. Since the amount of desporulated bacteria can vary from a container to another, it is recognized to observe all kinds of shelf life time period from a container of milk to another originating from the same batch of pasteurized milk. Consequently, some containers of milk will not be able to successfully last the shelf life period declared on the container. Indeed, the growth and reproduction rate of these desporulated bacteria explodes in some cases, which consequently causes off flavors and bad odor which makes such product unsatisfactory for human consumption. Another notable characteristic is that daily microbial analysis of the fresh pasteurized milk doesn't always show that problem. The counts in the fresh pasteurized milk can be under 100 colonies per ml, even though some of these milk containers will then not be able to last the shelf life period.

Actual pasteurization method is recognized for not being efficient enough to really control that problem. Even more, some studies have shown that increasing further up the pasteurization temperature may cause even more sporulated bacteria to desporulate once in the container and then make the problem even bigger. Only UHT process (ultra high temperature @275° F. or 135° C. maintained for 3 seconds) has the ability to kill all the spores, but that process is costly in energy and the bottling requires aseptic fillers which are also expensive. To better respond to that problem, people in the industry first control the milk temperature as close as possible to 33° F. (1° C.), or slightly higher, from the farm to the plant, and then in the plant on the raw side up to the pasteurizer, and from the discharge of the pasteurizer to the pasteurize storage silo and finally from the silo to the filler and up to the delivery of the packaged milk at the grocery store. Needless to say that the container must be stored at temperature as close as possible to 33° F. (1° C.) at the store and finally at the consumer's location as well.

Also, dairy plant owners request better operational sanitation procedures at the farm level when milking the cows and when washing the milking equipment, the pipeline and the bulk tank. However, this control is difficult to ensure on a daily basis with every farmer throughout the year, and especially during extra busy farming seasons. Dairy plant owners must also make sure the cleaning and sanitizing procedures of all processing equipment, wall, floors and drains are at their best day after day.

Also, the problem described in Example 1 exists with the pasteurization of fluid milk with the difference that the pasteurized product comes out of the pasteurizer at a much colder temperature i.e. as close as possible to 33° F. (1° C.). In this case, the surviving bacteria that attach on colder plate surfaces that range from 33 to 69° F. (1 to 20° C.) are ones known as psychrotrophic and can also affect product shelf life as they become in lower numbers and start to detach to go with the cold milk.

In conclusion with this example #2, there is also a need for an improved pasteurization method and efficacy for the pasteurization of raw liquid food products such as milk or soy milk or rice milk or liquid egg or any other raw liquid food product intended for drinking consumption.

EXAMPLE #3

Also in the fluid drinking milk industry, there would be a need to not increase the pasteurization temperature and still increase its efficacy so the 99.0 to 99.5% microorganism killing ratio would get closer to 100%. That efficacy would also go up against spores of bacteria and thermoduric bacteria which have a well known resistance. And, there would be a need to not increase the temperature of pasteurization because of the desire to not denature the proteins, neither caramelize the sugar and alter the taste of fresh pasteurize milk.

EXAMPLE #4

Whey is a by-product of the cheese making process. This liquid is separated from the cheese that was formed by coagulation and precipitation and is sent to a series of processing steps which include in most plants a pasteurization step or a heat treatment step (partial pasteurization). Separating, concentrating and denaturing the proteins contained in whey has become a big part of the cheese making process because of the high nutritional and financial value of the whey proteins, which can be sold on the market place as a food additive in numerous food formulations or because the whey proteins once separated, concentrated and denatured can be added into further cheese making process in the milk pasteurization step to increase cheese yield (denatured whey protein can coagulate to make cheese as well). However, there are several drawbacks or risks to doing its reinsertion into further cheese making process. It has been very well known that whey may contain some viruses (also called bacteriophage) which can be a problem in cheese making. If the viruses infect the bacteria, the fermentation slows down, or even stops. The killing of bacteriophage is done at a much later step (denaturation of the whey protein). It would be very beneficial and a lot safer in terms of food safety to accomplish a better destruction rate during the pasteurization heat treatment step, but it would need to be done at a more elevated temperature than actually seen in the industry to assure a better destruction rate. The reason people won't do that during the pasteurization step of the fresh whey is that too high a whey temperature causes precipitation of the mineral salts (more likely the calcium) present in the whey, which consequently will clog the different membranes in the filtering process, which will cause fouling. In fact, some cheese plant will even thermize (heat treat at a lower temperature than pasteurization) the whey instead of pasteurizing it for that reason.

Also, achieving a better killing efficacy of the microorganism with minimization of biofilm build up in the pasteurization of the whey would be very beneficial. Biofilms originate from the presence of bacteria that survived the pasteurization of the whey. Again, just like the pasteurization of milk for further fermentation process, thermoduric bacteria are present in the whey and are susceptible to survive pasteurization or thermization process. Their survival is also undesired because of their property of transforming the lactose present in the whey into lactic acid. As the pH of the whey drops, the quality of the finished product is affected, and that fact may cause other problems during further evaporation and drying processes. A better prevention of bacteria attachment and biofilm accumulation would also be desired in the pasteurizer itself since the fresh pasteurized whey comes out of the pasteurizer at a much higher temperature than the temperature of milk for cheese process or milk for bottling process. In fact, fresh pasteurized whey comes out at 96-133° F. (36-56° C.), which means that the surviving bacteria have a higher temperature range to grow and actually produce even more biofilms, which is highly undesired as the whey gets into the membrane filtering processes such as reverse osmosis, nano filtration, ultra filtration and micro filtration. Biofilms are known as being the worst enemy in membrane because their presence and accumulation can plug up or foul the membranes and slow down the flux. In conclusion with this Example #4, there is also a need to improve destruction rate of the virus and also better kill and better prevent bacteria attachment and better breakdown and remove biofilm accumulation on the surfaces of a pasteurizer so there will be much lower number of bacteria and biofilms that will reach the membrane systems.

While the above examples mainly concern milk products and their derivatives, other food processing processes present similar problems.

Against this background, there exist a need for an improved method for controlling microorganisms in a heat exchanger while processing a food product. An object of this invention is to provide such a method.

SUMMARY OF THE INVENTION

In a broad aspect, the invention provides a method for controlling microbiological contamination in a heat exchanger while using the heat exchanger to process a milk product. The method includes: while processing the milk product in the heat exchanger, adding a microbiological control agent to the milk product at a first location; and neutralizing at least partially the microbiological control agent by adding a neutralizing agent to the milk product at a second location, the second location being downstream from the first location, at least part of the heat exchanger being between the first and second locations, the neutralizing agent being operative for reducing a chemical reactivity of the microbiological control agent in the milk product. The microbiological control agent controls the microbiological contamination in the heat exchanger while the milk product is processed.

For the purpose of this document a milk product is a fluid made of milk alone or milk to which additional ingredients have been added. A non-limiting list of such ingredients includes vitamins, sugar, flavour (natural and/or artificial), colouring agent, stabilizer, gum, thickener, acidulant, milk protein, cream, whey protein, starch, pectin, gelatin, fruit jelly, lactic acid, lactose, whey concentrate, sweeteners, vegetable oil, rennet, culture, fiber, nutritional supplement and any other ingredients necessary for the production of: drinking milk, milk based beverages, nutritional milk, fermented milk, drinking yogurt, cheese, quark, kefir, yogurt, ymer, filmyölk, skyr, butter, butterfat, buttermilk, egg nog, sour cream, whipped cream, clotted cream, cream, ice cream, ice milk, infant formula, whey and any other product that contains milk. Also, the milk product may be a milk product from which some ingredients present in milk have been removed, partially or completely, such as fat, proteins, water and polysaccharides.

Microbiological contamination includes any microorganisms and other contamination produced by these microorganisms. The contamination is caused by the presence of microorganisms that should not be present in the heat exchanger and that are somehow attached or adhered to the inside surfaces of the heat exchanger so that normal flow of the milk product does not flush the contamination out of the heat exchanger. An example of such contamination is bacteria and their associated biofilms. Also, the accumulation of attached microorganisms with their biofilms, once it starts, favors a faster and easier disadvantageous precipitation of minerals and other constituent of the milk because it provides more attachment point. Control of the contamination includes reducing or stopping growth of the microorganisms, at least partially cleaning the heat exchanger or at least partially sanitizing the heat exchanger, among other possibilities.

While the invention as described above is directed to cleaning of a heat exchanger, in some embodiments many heat exchangers are provided in series and the proposed method may control microbiological contamination simultaneously in one, two or more of these heat exchangers.

The invention advantageously allows control of microbiological contamination without stopping milk product processing, which processing includes heating and/or cooling the milk product using the heat exchanger. This is made possible by the use of the neutralizing agent that reduces the chemical reactivity of the microbiological control agent so that the milk is not significantly affected by the microbiological control agent once the microbiological control agent has been neutralized. Indeed, milk products are complex products that must satisfy very strict quality criteria. The microbiological control agents are by definition reactive substances that attack organic molecules to control the contamination. It has been found that by suitable choices of microbiological control agent, neutralizing agent, duration of treatment and concentration of these two substances, the milk product can remain only slightly affected while producing a significant effect on the microbiological contamination that reduces the need to stop production for cleaning purposes.

The microbiological control agent and the neutralizing agent may include one or more elements. Element is to be understood as a substance, and not necessarily as a one of the chemical elements from the periodic table of elements, although in some embodiments, such chemical elements may be an element part of the microbiological control agent or the neutralizing agent.

In some embodiments of the invention, the microbiological control agent is added to the milk product for a predetermined duration, the method further comprising decreasing a quantity of the microbiological control agent added to the milk product after the predetermined duration while still processing the milk product in the heat exchanger.

In some embodiments of the invention, the microbiological control agent is added to the milk product until a predetermined volume of the milk product has passed through the first location, the method further comprising decreasing a quantity of the microbiological control agent added to the milk product after the predetermined volume of the milk product has passed through the first location while still processing the milk product in the heat exchanger.

Decreasing the quantity of the microbiological control agent added to the milk product may include stopping addition of the microbiological control agent to the milk product.

In some embodiments of the invention, the microbiological control agent is added to the milk product so that a concentration of the microbiological control agent in the milk product varies in time. For example, the microbiological control agent is added to the milk intermittently. In very specific examples, the microbiological control agent is added to the milk product intermittently on a basis of a volume of the milk product flowing past the first location or on a time basis.

In some embodiments of the invention, the first location is located upstream of the heat exchanger. In some embodiments of the invention, wherein the first location is located in the heat exchanger. In some embodiments of the invention, the first location is located in between two heat exchanger In some embodiments of the invention, the second location is located downstream of the heat exchanger. In some embodiments of the invention, the second location is located in the heat exchanger.

In some embodiments of the invention, the method further comprises diverting the milk product in which the microbiological control agent has been added in a reservoir, the second location being the reservoir.

In some embodiments of the invention, the milk product is used in a fermentation process downstream of the first location, the fermentation process being performed at a fermentation temperature, the first location being a location at which a temperature of the milk product is within about 20° C. of the fermentation temperature.

In some embodiments of the invention, the milk product is bottled downstream of the second location at a bottling temperature, the first location being a location at which a temperature of the milk product is within about 20° C. of the bottling temperature.

In some embodiments of the invention, neutralizing at least partially the microbiological control agent includes measuring the microbiological control agent in the milk product downstream of the first location to obtain a microbiological control agent measurement; determining a neutralizing agent quantity of the neutralizing agent on a basis of the microbiological control agent measurement; and adding the neutralizing agent quantity of the neutralizing agent at the second location.

In some embodiments of the invention, the neutralizing agent quantity is equal to a quantity required to substantially entirely neutralize the microbiological control agent present at the second location and downstream of the second location.

In some embodiments of the invention, the method further comprises confirming that the microbiological control agent has been substantially entirely neutralized downstream of the second location.

In some embodiments of the invention, the microbiological control agent is an oxidizer and the neutralizing agent is an anti-oxidant. In some embodiments of the invention, the anti-oxidant includes a calcium ion.

In some embodiments of the invention, the microbiological control agent includes a microbiological control element selected from the group consisting of peracetic acid, octanoic acid, decanoic acid, a percarbonic acid, a peracid, hydrogen peroxide, percarbonate, perborate, a peroxycarbonic acid, sodium carbonate peroxyhydrate, sodium perborate, ozone, acetic acid, an organic acid, an inorganic acid and chlorine dioxide, among others.

In some embodiments of the invention, the microbiological control agent includes peracetic acid.

For example, a concentration of the peracetic acid in the milk product in the heat exchanger is from about 1 ppm to about 100 ppm. In other examples, a concentration of the peracetic acid in the milk product in the heat exchanger is from about 1 ppm to about 250 ppm, from about 1 ppm to about 2500 ppm, from about 1 ppm to about 10 ppm or from about 3 ppm to about 5 ppm.

In some embodiments of the invention, the neutralizing agent includes a neutralizing element selected from the group consisting of ascorbic acid, ascorbyl palmitate, ascorbl stearate, calcium ascorbate, calcium bisulphite, calcium citrate, calcium lactate, calcium metabisulphite, calcium phosphates, calcium sulphite, calcium tartrate, calcium thiophosphate, calcium thiosulfate, citrate acid, citric acid, dilauryl thiodipropionate, distearyl thiodipropionate, erythorbic acid, potassium ascorbate, potassium bisulphite, potassium citrate, potassium lactate, potassium metabisulphite, potassium phosphates, potassium sulphite, potassium thiosulphate, potassium thiophosphate, sodium ascorbate, sodium bisulphite, sodium citrates, sodium erythorbate, sodium metabisulphite, sodium sulphite, sodium thiosulphate, sodium thiophosphate, and catalase among others.

In some embodiments of the invention, the milk product includes fat, the method further comprising removing substantially all the fat from the milk product upstream of the first location.

In some embodiments of the invention, the method further comprises reintroducing at least part of the fat removed from the milk product in the milk product at a moment and location such that the fat is substantially unaffected by the microbiological control agent.

In some embodiments of the invention, the microbiological control agent is added to the milk product for a first duration of from about 1 s to about 1000 s and wherein no microbiological control agent is added to the milk product after the first duration for a second duration of from about 1 s to about 1200 min. In other embodiments of the invention, the microbiological control agent is added to the milk product in a first concentration for a first duration of from about 1 s to about 1000 s and wherein the microbiological control agent is added to the milk product in a second concentration for a second duration of from about 1 s to about 1200 min, the second concentration being smaller than the first concentration.

In some embodiments of the invention, the microbiological contamination includes a biofilm, the method further comprising at least partially breaking down the biofilm in the heat exchanger using the microbiological control agent. In some embodiments of the invention, the microbiological contamination includes a biofilm, the method further comprising at least partially removing the biofilm in the heat exchanger using the microbiological control agent. In some embodiments of the invention, the microbiological contamination includes attached microorganisms, the method further comprising at least partially removing the attached microorganisms from the heat exchanger using the microbiological control agent. In some embodiments of the invention, the microbiological contamination includes attached microorganisms, the method further comprising killing at least some of the attached microorganisms in the heat exchanger using the microbiological control agent.

In some embodiments of the invention, the method further comprises mixing together the microbiological control agent and the milk product.

In some embodiments of the invention, the method further comprises mixing together the neutralizing agent and the milk product containing the microbiological control agent.

In some embodiments of the invention, the microbiological control agent includes a surfactant.

In some embodiments of the invention, the milk product includes dissolved oxygen, the method comprising removing at least part of the dissolved oxygen.

In some embodiments of the invention, the microbiological control agent includes a microbiological control element selected from the group consisting of a chelating agent, a dispersing agent, an emulsifying agent, a conditioning agent, a detergent, a wetting agent, a surface acting agent, a surfactant, a penetrating agent, a surface tension reducing agent, a softening agent, an emulsifying agent, a solubilizing agent, a foaming agent, a defoaming wetting agent, an acid, a base, sodium hydroxide, potassium hydroxide, calcium hydroxide, magnesium hydroxide, an alkaline phosphate based chemical, a silicate based chemical, a carbonate based chemical, a sulfate based chemical, a polyacrylate based chemical, an enzyme, an oxidizing agent, an anti-oxidant agent a phosphonate based chemical, an organic based chelating chemical, a gluconate based chemical, an ethylenediaminetetraacetic acid (EDTA) based chemical, and an enzyme, among others.

In some embodiments of the invention, the microbiological control agent is a cleaning agent. In some embodiments of the invention, the microbiological control agent is a sanitizing agent.

In some embodiments of the invention, the heat exchanger is part of a system selected from the group consisting of a heat treatment system, a pasteurizer, a thermizer and a High Temperature Short Time (HTST) heating system.

An embodiment of the invention includes adding the microbiological control agent, such as an oxidizer, as close as possible to the location that bacteria are most susceptible to attach and form biofilms because a portion of the microbiological control agent may be degraded by the organic matter of the milk (protein, sugar, fat) as soon as it gets in contact with it. This degradation is also accelerated as the temperature of the product rises.

In another broad aspect, the invention provides a method for controlling microbiological contamination in a heat exchanger while using the heat exchanger to process a food product. The method includes: while processing the food product in the heat exchanger, adding a microbiological control agent to the food product at a first location; and neutralizing at least partially the microbiological control agent by adding a neutralizing agent to the food product at a second location, the second location being downstream from the first location, at least part of the heat exchanger being between the first and second locations, the neutralizing agent being operative for reducing a chemical reactivity of the microbiological control agent in the food product. The microbiological control agent controls the microbiological contamination in the heat exchanger while processing the food product.

In another broad aspect, the invention provides a method for controlling microbiological contamination in a heat exchanger while using the heat exchanger to process a food product, the method comprising: while processing the food product in the heat exchanger, adding a microbiological control agent to the food product at a first location; and neutralizing at least partially the microbiological control agent at a second location, the second location being downstream from the first location, at least part of the heat exchanger being between the first and second locations. The microbiological control agent controls the microbiological contamination in the heat exchanger while the food product is processed.

In some embodiments of the invention, neutralizing at least partially the microbiological control agent at the second location includes creating cavitation in the food product at the second location.

In some embodiments of the invention, neutralizing at least partially the microbiological control agent at the second location includes adding a neutralizing agent to the food product at the second location, the neutralizing agent being operative for reducing a chemical reactivity of the microbiological control agent in the food product.

The invention also provides a system for performing the above described methods.

The proposed method applies therefore not only for the pasteurization/thermization and production of milk products, but also for the pasteurization thermization and production of finished products such as juices, soft drinks, baby food formulated liquid products, vegetable based liquid products, liquid egg products, soy milk products, rice milk products, milk products intended for further fermentation process (cream cheeses, yogurt, sour cream, fermented milk, quark, etc.), vegetable and/or mineral based liquid products intended for further fermentation process (analog cheeses, yogurt, sour cream, fermented milk, quark, etc.), wine, beer, alcohol based drinks, coffee based products, tea based products and any other pasteurize or thermize liquid food or pharmaceutical products or probiotic products or food additives or food supplements or medicinal products that are intended for human or animal consumption or for supplement or for medical treatment.

Other objects, advantages and features of the present invention will become more apparent upon reading of the following non-restrictive description of some embodiments thereof, given by way of example only with reference to the accompanying drawings.

DETAILED DESCRIPTION

Figure 1:
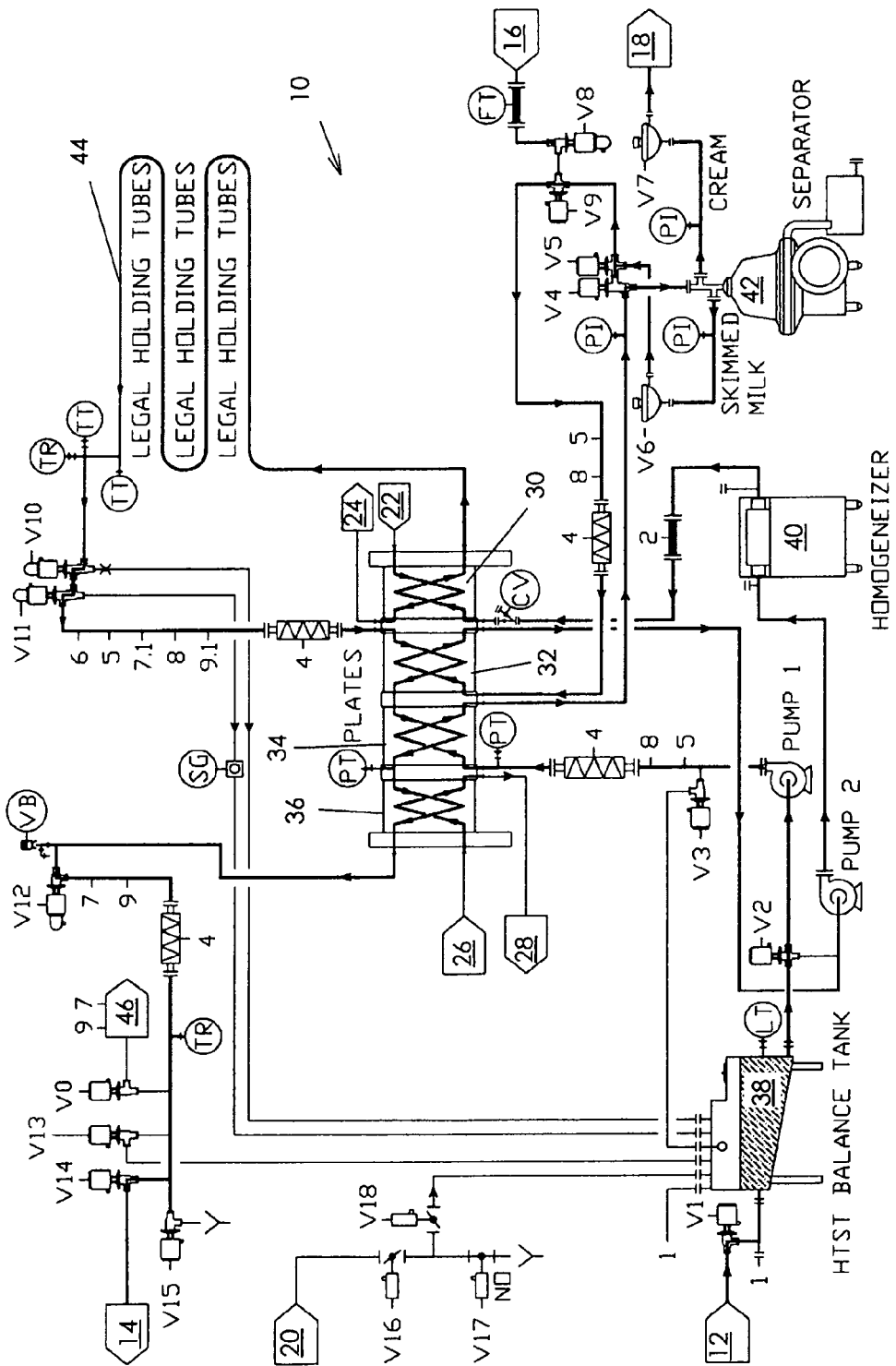
FIG. 1, in a schematic view, illustrates a system implementing a method for controlling microbiological contamination in a heat exchanger in accordance with an embodiment of the present invention.

In this document, the invention is described as it relates to milk products, often shortened to "milk" for clarity. However, the usage of the product "milk" should be considered as non limitative to the different applications of this invention and many other suitable food or food supplement or food additive or pharmaceutical or probiotic or medicinal based liquid could be used instead without departing from the scope of this invention. Furthermore, while the present document refers to bacteria most of the times, it should be known and accepted that the invention applies to control of any microorganisms such as yeast, mold, algae, viruses and other living microorganisms that could be present in a liquid food product.

The proposed method innovates with the addition of a microbiological control agent, which may include one or more substances, into the process flow of the food liquid prior to a heat exchanger or into the heat exchanger to at least one, and alternatively many, injection point. The microbiological control agent, once injected for example by a metered or micro metered pump, even in small concentration, has good anti-microbial properties and/or good biofilm breakdown properties. For example, the microbiological control agent is an oxidizer and the oxidizing and sanitizing properties of the oxidizer are intended to kill and remove at least partially the attached surviving bacteria and their associated biofilms present at several locations on the interior surfaces of the heat exchanger. The reason the anti-microbial chemical used in this invention has in some embodiments oxidizing properties or is combined with an oxidizer is to not only kill the flowing and attached bacteria but also to cut, at least partially, the organic molecules that the biofilm is made of to a point that it is reduced in size and consequently detached from the surface. This action is advantageously done by oxidization. As the oxidizer cuts the organic chain of the molecules that the biofilm is composed of, some quantity of oxidizer is consequently destroyed by the organic matter which is at the same time degraded. Also, as the biofilm is cut and reduced in size, the bacteria that was enveloped and protected by the biofilm becomes reachable by some other presence of non-degraded oxidizer and consequently becomes attackable by that oxidizer.

It is within the scope of the invention in some embodiments to add the oxidizer in a location of a pasteurizer where the food liquid temperature is going up rapidly or is already high so the combination of oxidizer and temperature increases the killing efficacy of the pasteurizer and also the removal of the attached bacteria and their associated biofilms. Also, adding the oxidizer in those locations of the pasteurizer will contribute to neutralize more oxidizer (heat applied on oxidizer decreases its stability and increases its degradation rate) and consequently will require the use of less anti-oxidant.

After benefiting from the action of the oxidizer onto the internal surfaces of the pasteurizer, the second part of the invention, which is optional in some embodiments, depending on the type of food liquid being pasteurized (some food liquid are not affected by a long exposure with an oxidizer), is to minimize the exposure of the oxidizer with the elements contained in the food liquid product. So when the mixture of oxidizer and food liquid reaches the discharge of the pasteurizer, immediately right at the discharge of the pasteurizer or into the reservoir where the pasteurized food liquid is being sent to, at least one food grade or a food processing anti-oxidant agent is injected into the product flow to at least one, and/or alternatively many, injection points, at which point the neutralization process of the residual amount of oxidizer is immediately initiated. Typically, just enough anti-oxidant is added to assure proper neutralization of the residual oxidizer without over dosing. Overdosing to a net residual concentration can also be done if desired for other purposes. The right dosing of both oxidizing and anti oxidizing products is accomplished and confirmed by performing analytical testing for the adjustment of the method and more if desired and in some other embodiments can be confirmed by proper automation. Overall, the efficacy of the pasteurizer is maintained longer during the production day run because a cleaning and sanitizing action is accomplished at least partially onto the interior surfaces of the pasteurizer while in production mode.

In a specific application such as the process of fermented products, i.e. cheese for example (as described in example #1), since any presence of oxidizer is not suitable in the milk when it is time to add the starter culture and initiate the fermentation process (oxidizer especially with anti-microbial properties can slow down or stop bacterial growth of the added starter culture or even kill it), as much oxidizer as possible is injected ideally by ratio of the milk flow into the milk flow of the pasteurizer or the thermizer (also called heat treat processor) through at least an injection point into as less milk as possible in order to get the highest possible concentration of oxidizer and consequently get the best possible action of killing, breakdown and removal of as much attached surviving bacteria and their biofilms as possible on the interior surfaces of the pasteurizer and also at the same time provide the lowest possible oxidization of the global volume of milk going through the pasteurizer. This injection of oxidizer is performed ideally at the beginning of the fill of a vat only on a portion of the milk volume going through the pasteurizer per vat fill—less than 50% of the batch volume. The injection of the oxidizer per vat fill stops from 1 second to 1000 seconds (or more if needed) before the addition of the starter culture. Also, even though the amount of oxidizer is maximized, the reaction time of the oxidizer with the milk is very short because of the high flow of pasteurization and also because it is allowed in the pasteurizer only up to the discharge pipe of the pasteurizer until the injection point of the anti-oxidant; the neutralization process of the oxidizer starting right at the discharge of the pasteurizer or in the flow of milk going to the vat to be filled for cheese making. Also, the largest portion of the milk going to the vat once the addition of the oxidizer has stopped is not exposed to any oxidizer because all of it has already been neutralized by the anti-oxidizing agent.

In another application using same background example #1, the food grade or processing aid oxidizer is injected continuously into the milk flow by ratio to the milk flow into the pasteurizer in at least one location. As soon as the presence of oxidizer in the milk flow reaches the discharge of the pasteurizer, the anti-oxidant is injected continuously into the milk flow by ratio to the milk flow of the pasteurizer at the discharge of the pasteurizer to assure proper, continuous and complete neutralization of the residual oxidizer. The oxidizer is injected in enough quantity to accomplish killing, breakdown and removal, at least partial, of the attached bacteria and their biofilms. The right dosing of both oxidizing and anti-oxidizing products is accomplished and confirmed by performing analytical testing for the adjustment of the method and more if desired and in some other embodiments can be confirmed by proper automation. The amount of anti-oxidant is supplied in sufficient dosage or concentration to assure complete neutralization of the residual oxidizer that is in the milk flow at the discharge of the pasteurizer. The neutralization process is completed in a short period of time so it doesn't affect the fermentation process Going further with situations similar to background examples #1, #2 and #3, the food grade or processing aid anti-oxidant is made of calcium on the positive ion side of the molecule since calcium is added in most cheese process in order to keep proper balance with the extra protein and fat to assure proper texture and desired increase yield. Also, in some other productions, calcium is added in some drinking product to be advertised as a supplement Going further with situations similar to background examples #1, #2 and #3, in some embodiments, the amount of calcium based anti oxidant replaces all the calcium food grade additive or a portion thereof. In reference to example #1, in another embodiment, the amount of calcium based anti oxidant required for the calcium content determines the quantity of oxidizer per batch of vat.

In another application, the injection of oxidizer is performed continuously or semi continuously into the product flow of the pasteurizer by ratio of the milk flow in at least one location and immediately neutralized with the proper addition of anti oxidant at the discharge of the pasteurizer at a specific location by ratio of the milk flow. The oxidizer is injected in enough quantity to accomplish killing, breakdown and removal, at least partial, of the attached bacteria and their biofilms. The anti oxidant is injected in enough quantity to assure proper and complete neutralization of the oxidizer. The right dosing of both oxidizer and anti oxidant products is accomplished and confirmed by performing analytical testing for the adjustment of the method and more if desired and in some other embodiments can be confirmed by proper automation. The advantage of the semi continuous addition of oxidizer is that a much higher concentration of oxidizer is added in a much lower volume of milk in order to provide a shock treatment and a better killing of the attached bacteria with a better breakdown and removal of the biofilms.

In an actual known area, some people keep running their pasteurizer for 20 hours every day knowing that the quality of the finish product in the last 3-4 hours or more of the run is continuously going down (as the number of surviving microorganisms and their biofilms is going up). Actual known cleaning methods with the use of built caustic and acid are not able to completely remove the daily accumulated biofilms. After a few days or a week or two or more of incomplete wash, attached biofilms accumulate to a level that a special cleaning treatment becomes mandatory to restore proper pasteurization level. Such treatment is in several cases very long and/or very costly. Also, while this special cleaning method is conducted there is no production. By removing and preventing, at least partially, the accumulation of bacteria and their biofilms at regular intervals of times or continuously throughout the entire day of pasteurization, the interior surfaces of the pasteurizer remain cleaner and consequently the killing rate of pasteurization remains excellent for a longer run which consequently makes a finish product with lower microbial counts throughout the entire day of production. Also, the other great benefit is that cleaning the pasteurizer at the end of the day with regular caustic and acid wash solution will give better results of cleaning.

By continuously or semi continuously removing, even partially, the slight accumulation of attached surviving bacteria and their biofilms with the addition of the oxidizer, the interior surfaces of the pasteurizer will remain cleaner throughout the entire day which explains why the killing rate of pasteurization remains high for longer.

Even though the pasteurization process is a continuous process, in some embodiments, the amount of oxidizer and anti-oxidant is calculated on a batch volume, meaning that each addition is calculated based on the volume of each cheese vat or each pasteurized silo. In other words, the addition of oxidizer can be done into the milk for a set duration of time in a set calculated quantity of milk that refers to a batch amount in ratio with the volume of pasteurized products pumped into the different reservoirs or tanks or silos for further process, and the same thing applies to the anti oxidant.

It is within the scope of the invention to inject the oxidizer and the anti oxidant in one batch volume only per production day in a chosen batch volume, or in more than one batch volume, or in any sequence of batch volume or even in every batch volume. Microbiological testing will confirm how often or in how many batch volumes it is suitable to add the oxidizer and the anti oxidant. If the method performs well in terms of killing and removal of bacteria and biofilms, and depending of the degree of response, it may become possible to inject the oxidizer and anti-oxidant only a few times a day.

Broadly speaking, the invention concerns a method for controlling microbiological contamination in a heat exchanger, for example one or more of the heat exchangers 30, 32, 34 and 36 shown in FIG. 1, while using the heat exchanger 30, 32, 34 and 36 to process a food product, for example a milk product. For clarity and simplicity, the case of a milk product is described in greater details hereinbelow. The method comprises: while processing the milk product in the heat exchanger 30, 32, 34 and 36, adding a microbiological control agent to the milk product at a first location (for example at one or more of the locations identified by reference numeral 5 in FIG. 1); and neutralizing at least partially the microbiological control agent by adding a neutralizing agent to the milk product at a second location (for example one or more of the locations identified by reference numeral 7 in FIG. 1), the second location being downstream from the first location, the neutralizing agent being operative for reducing a chemical reactivity of the microbiological control agent. At least part of one of the heat exchangers 30, 32, 34 and 36 is between the first and second locations 7 and 9. The microbiological control agent reduces microbiological contamination in the heat exchanger 30, 32, 34 and 36 while the milk product is processed.

The proposed method can be performed in many systems. FIG. 1 illustrates in a schematic view a non-limiting example of such a system 10. The system 10 is usable for example to pasteurize and process milk. The system 10 uses a specific case of a microbiological control agent in the form of an oxidant and a neutralizing agent in the form of an anti-oxidant. The system 10 includes a milk inlet 12 and a milk outlet 14 for respectively receiving and releasing the milk to process. The system 10 also includes, in some embodiments, a cream inlet 16 and a cream outlet 18 respectively receiving and releasing the cream provided, at least in part, in the milk to process. A potable water inlet 20 receives potable water from a suitable potable water source. Hot water inlet and outlet 22 and 24 respectively receive and release hot water from a suitable hot water source and cold water inlet and outlet 26 and 28 respectively receive and release cold water from a suitable cold water source.

Various valves V0 to V18 control the flow of milk in the system 10 in accordance with a conventional method of operation. A tank level transmitter LT monitors the level of milk in the HTST balance tank 38. Other conventional components of similar pasteurization systems, such as pressure transmitters PT, pressure indicators PI, flow transmitters FT, temperature transmitters TT, thermometer indicators TR, sight glasses SG, check valve CV, pumps PUMP1 and PUMP2 and vacuum breaker VB, among other possibilities, are also provided at suitable and conventional locations. These components are used to monitor and regulate the pasteurization process in a conventional manner.

The system 10 also includes four heat exchangers 30, 32, 34 and 36, described in greater details hereinbelow. The system 10 further includes other conventional components such as a HTST balance tank 38, a homogeneizer 40, a separator 42 and a holding tube 44. The HTST balance tank 38 is in fluid communication and may receive fluids from the potable water inlet 20 (under control of the valve V18) for pushing the milk out of the pasteurizer and also to perform rinsing, washing, sanitizing and cut in/cut out steps, the milk inlet 12 (under control of the valve V1), the milk outlet of the fourth pasteurizer 36 (under control of the valve V13), the holding tube 44 under control of the valve V10) and the outlet of the HTST balance tank 38 (under control of the valve V3, for mixing with the other sources). The HTST balance tank 38 is in fluid communication with the third heat exchanger 34 for providing milk thereto, under control of the valve V2.

The homogeneizer 40 is in fluid communication with the second heat exchanger 32 to receive milk therefrom and with the first heat exchanger 30 to provide homogeneized milk thereto. The separator 42 is in fluid communication with the third heat exchanger 34 to receive milk therefrom (under control of the valve V4) and with the second heat exchanger 32 to provides milk thereto (under control of the valve V5). The separator 42 is also in fluid communication with the cream outlet 18 to provide cream extracted from the milk received from the third heat exchanger 34 thereto (under control of the valve V7). The milk released to the second heat exchanger 32 can also be mixed with cream received from the cream inlet 16 for fat level adjustment (under control of the valve V9). The holding tube 44 is in fluid communication with the first heat exchanger 30 to receive milk therefrom and with the second heat exchanger 32 to provide milk thereto (under control of the valve V11). The holding tube 44 is of a length sufficient for maintaining the temperature of the milk circulating therein at a temperature high enough to perform pasteurization for a sufficient amount of time.

Each heat exchanger 30, 32, 34 and 36 is for example of the counterflow plate type. The heat exchangers 30, 32, 34 and 36 are used to heat and cool the milk being pasteurized and to recover at least a portion of the heat used therefor to increase the energy efficiency of the pasteurization process.

Hot water inlet and outlet 22 and 24 are in fluid communication with the first heat exchanger 30 and used to circulate hot water thereinto. The first heat exchanger 30 is in fluid communication with the homogeneizer 40 to receive milk therefrom and with the holding tube 44 to provide milk thereto. The first heat exchanger 30 heats this milk using heat contained in the water circulated between the hot water inlet and outlet 22 and 24. The temperature of the hot water is sufficiently high to raise the temperature of milk circulating in the first heat exchanger 30 to a level suitable to reach a set pasteurization temperature.

The second heat exchanger 32 is in fluid communication with the separator 42 to receive milk there from and with the homogeneizer 40 to provide milk thereto. The second heat exchanger 32 is also in fluid communication with the holding tube 44 to receive the pasteurized milk therefrom and with the third heat exchanger 34 to provide milk thereto. The second heat exchanger 32 heats the milk incoming from the separator 42 using heat contained in the milk coming from the holding tube 44. Simultaneously, the second heat exchanger 32 therefore cools the milk coming from the holding tube 44.

The third heat exchanger 34 is in fluid communication with the HTST balance tank 38 to receive milk therefrom and with the separator 42 to provide milk thereto. The third heat exchanger 34 is also in fluid communication with the second heat exchanger 32 to receive milk therefrom and with the fourth heat exchanger 36 to provide milk thereto. The third heat exchanger 34 heats the milk incoming from the HTST balance tank 38 using heat contained in the milk coming from the second heat exchanger 32, which itself comes from the holding tubes 44. Simultaneously, the third heat exchanger 34 therefore cools the milk coming from second heat exchanger 32.

The fourth heat exchanger 36 is in fluid communication with the third heat exchanger 34 to receive milk therefrom and with the milk outlet 14 to provide milk thereto (under control of the valves V12 and V14). Cold water inlet and outlet 26 and 28 are in fluid communication with the fourth heat exchanger 36 and used to circulate cold water thereinto. The temperature of the cold water is sufficiently low to lower the temperature of milk circulating in the fourth heat exchanger 36 to a level suitable for handling of the pasteurized milk.

Reference numerals 5 and 7 indicate preferred first and second locations including respectively an oxidizer providing component and an anti-oxidant providing component. Alternative first locations for providing an oxidizer providing component are indicated by reference numeral 1 and 3. The oxidizer providing component typically includes an oxidizer tank for containing the oxidizer and an oxidizer dosing element for releasing a suitable quantity of the oxidizer from the oxidizer tank in the system 10. The anti-oxidant providing component typically includes an anti-oxidant tank for containing the anti-oxidant and an anti-oxidant dosing element for releasing a suitable quantity of the anti-oxidant from the anti-oxidant tank in the system 10. Similarly, reference numerals 8 and 9 indicate locations including respectively an alkaline/acid/chelating agent/wetting agent providing component and a neutralizing chemical providing component. Reference numerals 7.1 and 9.1 indicate alternative locations for the components corresponding respectively to reference numerals 7 and 9.

Process flow meters 2 allow monitoring of the flow of fluids in the system 10 and are in communication with the oxidizer dosing elements for allowing the latter to dispense the suitable quantity of the oxidizer. In some embodiments of the invention, static mixers 4 are provided downstream of oxidizer and anti-oxidant providing components for mixing the oxidizer and the anti-oxidant to the milk.

Reference numeral 6 indicates the location in system 10 at which the milk is pasteurized according to regulations.

Figure 2:
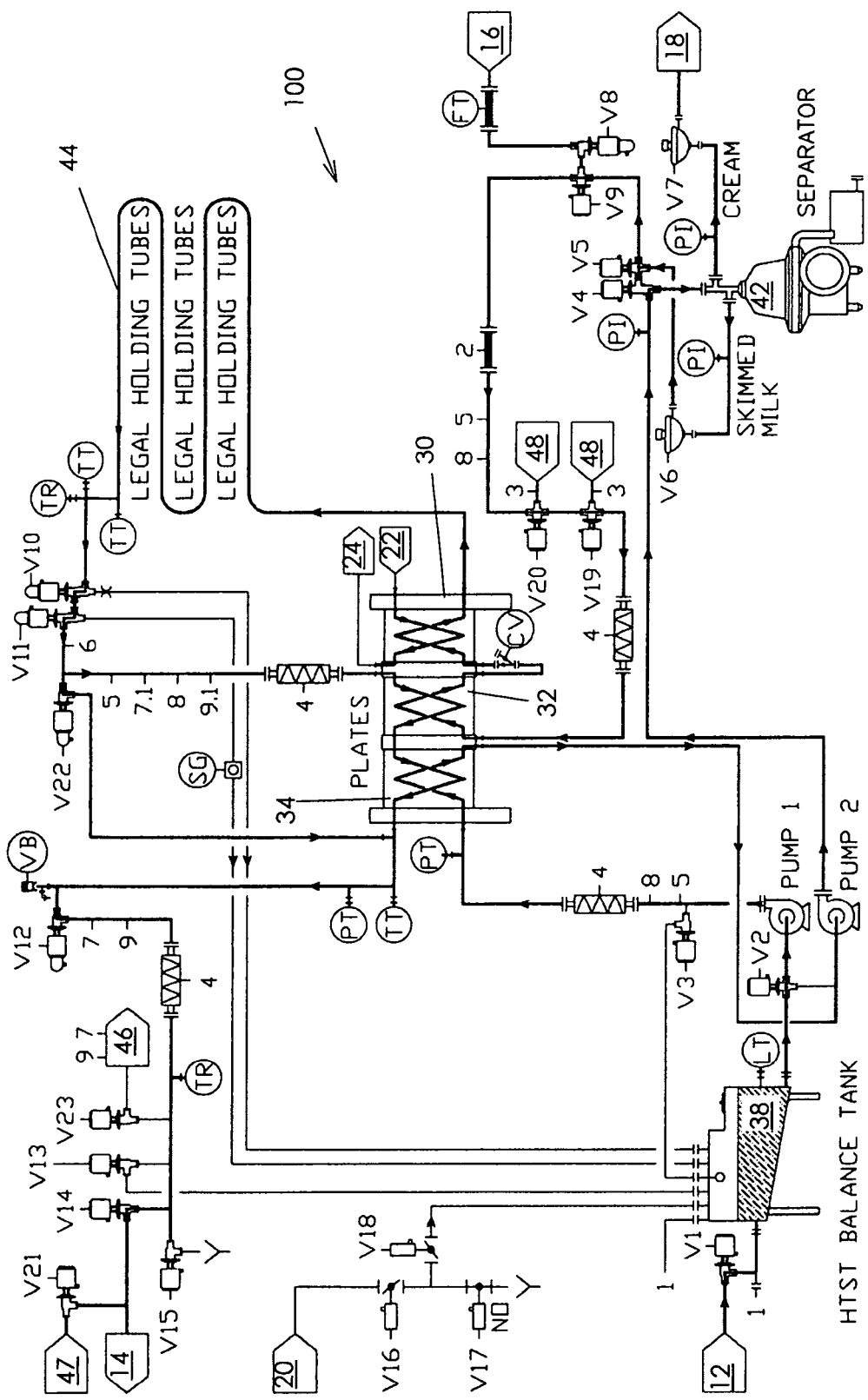
FIG. 2, in a schematic view, illustrates a system implementing a method for controlling microbiological contamination in a heat exchanger in accordance with another embodiment of the present invention.

In some embodiments of the invention, a reservoir 46 is provided for selectively receiving a portion of the milk through operation of the valve V0, as described in further details hereinbelow FIG. 2 illustrates an alternative system 100 usable for example to pasteurize and process milk for fermentation. The system 100 is similar to the system 10 and only differences therebetween are described hereinbelow.

First, the system 100 does not include the homogeneizer 40. Instead, the milk that comes from the first heat exchanger 30 that is conveyed to the homogeneizer 40 in system 10 is fed immediately in the second heat exchanger 32. Also, the system 100 does not include the cold water inlet and outlet 26 and 28 and the fourth heat exchanger 36. The milk that in system 10 comes from the third heat exchanger 34 to enter the fourth heat exchanger 36 is instead directed towards the milk outlet 14.

There are some additional components in system 100 that are not present in system 10. First, a starter culture injector 47 is provided between the third heat exchanger 34 and the milk outlet 14. Also, one or more milk ingredient injectors 48 is provided between the separator 42 and the second heat exchanger 32. Finally, 23 valves are provided in the system 100 compared to 19 in the system 10.

The proposed systems 10 and 100 and method of operating the same provide many innovations when compared to conventional pasteurization systems and methods. First, there is an increase in the killing rate of pasteurization or thermization (also called heat treatment process) against all already present living microorganisms in the raw product to be pasteurized such as milk, juices, soft drinks, liquid egg products, wine, beer any other food liquid based products that need to be pasteurized for further process and/or packaging.

In the whey process (by-product of the production of cheese), there is an increased killing rate of pasteurization against the lactic acid former bacteria and their associated biofilms that are coming from the cheese process and also against some viruses such as bacteriophages that can be present in the whey. Furthermore, there is an increase and/or maintenance of killing rate of pasteurization or thermization (also called heat treatment process) more specifically on thermoduric and/or thermophilic bacteria which are known for some of them to be able to survive pasteurization temperatures and consequently affect, because of their undesired presence and reproduction, into the fermentation process of milk based products such as yogurt, cheese, quark, fermented milk, sour cream, etc. and also fermented soy based products and other bio-fermented products. Yet furthermore, there is an increased killing rate of spore former bacteria and their spores.

The proposed systems 10 and 100 and methods provide an improved control of surviving microorganisms, and more specifically bacteria that are known to survive and attach on the interior surfaces of a pasteurizer at very specific locations and temperature sand then form biofilms while in pasteurization mode. These interior surfaces are all the surfaces in contact with the milk flow, more specifically the balance tank(s) 38, the raw and pasteurize regeneration plates or tubes and the heating plates or tubes of heat exchangers, such as heat exchangers 30, 32, 34 and 36, the holdings tubes 44 or holding plates and all associated piping, pumps and instrumentation devices which are part of the pasteurizer. That killing, at least partial, of the surviving microorganisms is consequently intended to perform a continuous or a semi continuous at least partial cleaning and sanitizing of the pasteurizer while in pasteurization mode, which is sufficient to help maintaining satisfactory pasteurization levels for longer runs without having to stop production and without having to make a midday wash or a full conventional wash and sanitize cycles.

There is also provided an improve killing, breakdown and removal, at least partial, of attached surviving microorganisms and their biofilms which microorganisms and more specifically bacteria that are known to survive and attach on the interior surfaces of a pasteurizer at very specific location and temperature and then form biofilms while in pasteurization mode which said interior surfaces are all the surfaces in contact with the milk flow, more specifically the balance tank(s) 38, the raw and pasteurize regeneration plates or tubes and the heating plates or tubes of heat exchangers, such as heat exchangers 30, 32, 34 and 36, the holdings tubes 44 or holding plates and all associated piping, pumps and instrumentation devices which are part of the pasteurizer but more specifically the balance tank(s) and the raw & pasteurize regeneration sections and all pipes in which the food product flows through. That killing, breakdown and removal, at least partial, of the attached surviving microorganisms and their biofilms is consequently intended to perform a continuous or a semi continuous cleaning and sanitizing, at least partial, of the pasteurizer while in pasteurization mode. And, that said cleaning and sanitize, at least partial, is sufficient to help maintaining satisfactory pasteurization levels for longer run and substantially delay or possibly in some cases eliminate the need to stop production and make a mid day wash or a full conventional wash and sanitize.

Furthermore, the proposed method maintains the surviving bacteria, if not destroyed, in a latent phase for longer so they will not grow and produce biofilms or at least grow slower and produce less biofilms as the presence of oxidizer as soon as it is detected by the bacteria may switch their metabolism very rapidly from a reproductive cycle to a defensive or protective cycle.

The proposed systems 10 and 100 and methods are intended to treat, by doing a metered or micro metered addition of the microbiological control agent in sufficient amount to:

treat the interior surfaces of a heat exchanger 30, 32, 34 and 36 at specific times and for a set duration while pasteurization is in production mode in order to increase killing rate on attached and non-attached surviving microorganism and destroy & remove as much of their biofilms as possible;

increase the efficiency of pasteurization of the food liquid product as it goes through the systems 10 and 100;

maintain the surviving bacteria in a latent phase so as to reduce their growth and biofilm production. Also, bacteria in most situations don't leave the latent phase as soon as the optimal conditions for growth and reproduction are back. It takes normally some time for the bacteria to react and switch to a reproductive and growth cycle. In some embodiments, an intermittent addition of the microbiological control agent has the advantage of keeping the growth of bacteria at a slow pace or stopped pace between microbiological control agent additions.

The proposed method may operate in many modes. In a first mode, the microbiological control agent (in a specific case the oxidizer) is added to the milk product for a predetermined duration, the method further comprising decreasing a quantity of the microbiological control agent added to the milk product after the predetermined duration while still processing the milk product in the heat exchanger 30, 32, 34 and 36. In a second mode, the microbiological control agent is added to the milk product until a predetermined volume of the milk product has passed through the first location 5, the method further comprising decreasing a quantity of the microbiological control agent added to the milk product after the predetermined volume of the milk product has passed through the first location 5 while still processing the milk product in the heat exchanger 30, 32, 34 and 36. In both modes, decreasing the quantity of the microbiological control agent added to the milk product may include stopping addition of the microbiological control agent to the milk product. In both modes, the microbiological control agent is added to the milk product so that a concentration of the microbiological control agent in the milk product varies in time.

In a specific embodiment, the microbiological control agent is added to the milk intermittently, or in other words is added for some time periods separated from each other by time periods during which the microbiological control agent is not added in the milk product. For example, the microbiological control agent is added to the milk product intermittently on a basis of a volume of the milk product flowing past the first location 5. In another example, the microbiological control agent is added to the milk intermittently on a time basis, that is for predetermined durations at predetermined time intervals.

For example, the microbiological control agent is added to the milk product for a first duration of from about 1 s to about 1000 s and no microbiological control agent is added to the milk product after the first duration for a second duration of from about 1 s to about 1200 min. In another example, the microbiological control agent is added to the milk product in a first concentration for a first duration of from about 1 s to about 1000 s and the microbiological control agent is added to the milk product in a second concentration for a second duration of from about 1 s to about 1200 min, the second concentration being smaller than the first concentration.

In the systems 10 and 100, the first location 5 is located upstream of the heat exchangers 30, 32, 34 and 36. However, in alternative embodiments of the invention, the first location is located in one of the heat exchangers 30, 32, 34 and 36. Also, the second location 7 is located downstream of the heat exchangers 30, 32, 34 and 36. However, in alternative embodiments of the invention, the second location 7 is located in one of the heat exchangers 30, 32, 34 and 36. Also, in alternative embodiments of the invention, it is also possible to have multiple first and second locations 5 and 7. In other words, the microbiological control and neutralizing agent can be injected at many locations.

In some embodiments, neutralizing at least partially the microbiological control agent includes measuring the microbiological control agent in the milk product downstream of the first location 5 to obtain a microbiological control agent measurement, determining a neutralizing agent quantity of the neutralizing agent on a basis of the microbiological control agent measurement, and adding the neutralizing agent quantity of the neutralizing agent at the second location 7. The microbiological control agent measurement can be quantitative, i.e. a precise dosage is measured, or only confirmatory to confirm that the microbiological control agent has been added. Methods and devices for measuring the presence of a microbiological control agent are known in the art and are conventional.

In some embodiment, the neutralizing agent quantity is equal to a quantity required to substantially entirely neutralize the microbiological control agent present at the second location 7 and downstream of the second location 7. In some embodiments, the method further comprises confirming that the microbiological control agent has been substantially entirely neutralized downstream of the second location 7 using conventional methods.

In some embodiments of the invention, the oxidizer is Peracetic Acid (PAA). PAA is an oxidizer that is recognized to be usable with good efficacy to destroy microorganisms and/or to break down their associated biofilms especially when the temperature of the carrying liquid increases along with the exposure time. Also, it is known that Peracetic Acid takes a longer period of time than most other oxidizers to be neutralized by the organic matter that is present in the food liquid processed product. The known relatively long residual activity of such chemical can however be a problem since it can cause oxidization of the finished product constituents and it can also cause some undesired bleaching or discoloring, even though this bleaching can be desired in some embodiments. Also, as Peracetic Acid is added to the milk, the content that reacts with organic components of the milk and the temperature (the higher is the temperature the faster PAA will degrade) degrades into acetic acid, oxygen and water. Knowing all these elements, it is important to achieve the desired effect in the shortest possible time. However, if PAA is submitted to high temperature, its faster degradation also relates to increased oxidizing reaction which means increased killing and removal of bacteria and biofilms. In some embodiments of the invention, the method of adding at least an oxidizer followed with the addition of an antioxidant is only to provide a desired bleaching of discoloring of the finish product The use of PAA is suitable in many applications of the proposed method because of its composition which can be added in the milk in reasonable quantity. PAA is issued from the reaction of hydrogen peroxide with acetic acid in water. So, Peracetic Acid is formed, with fair to high residual of hydrogen peroxide and acetic acid in water. Relatively high concentrations of hydrogen peroxide in the PAA is desired in some embodiments to better perform the microbiological control process. When injected into the milk, overtime PAA is decomposed into acetic acid, oxygen and water. Hydrogen peroxide is also decomposed into oxygen and water as it reacts with the organic components of the milk. Acetic acid remains as acetic acid or may be neutralized by some of the food liquid constituent. Even though PAA has not been added into food liquid pasteurizer, another good reason to use PAA in this invention is because it is already approved by regulations in many countries for use in direct food contact in water to wash or peel fruit and vegetables, also in chill water circulation system to chill poultry and beef carcasses and also in whey prior to filtration process.

Peracetic Acid is also readily commercially available. Peracetic Acid, also known as peroxyacetic acid, acetic peroxide, acetyl hydroperoxide, and is commercially available in solution with acetic acid and hydrogen peroxide to maintain stability. Further, Peracetic Acid is marketed under the trade name Proxitane®, Oxonia Active®, Divosan Active® and others. It is a chemical in the organic peroxide family known to have a strong oxidizing potential, and is represented as chemical formula CH3CO—OOH. Peracetic Acid is produced by reaction of hydrogen peroxide with acetic acid. Various rations of acetic acid to hydrogen peroxide can be used to produce Peracetic Acid. The results product will contain an excess of hydrogen peroxide, acetic acid or both hydrogen peroxide and acetic acid. Products with either of the material in excess can be employed in this invention. Also, the presence of hydrogen peroxide in commercial Peracetic Acid formula is suitable in this invention. In fact, hydrogen peroxide, being also an oxidizer itself, is not as effective at killing bacteria at low concentration, but it is recognized to be better than Peracetic Acid at degrading and reducing the organic matter that biofilms are made of. Consequently, the presence of both the hydrogen peroxide and Peracetic Acid increase the efficacy of the proposed method.

In most commercial Peracetic Acid formulas, a stabilizer is added to make the product more stable and consequently can be stored for longer period of time before it is used. In some embodiments, it is suitable not to have any stabilizer part of the formula so the oxidizer can be even more aggressive once added to the fluid and then react faster to degrade the biofilm and kill the attached bacteria. By degrading faster the PAA, there will be less residual of PAA and consequently less anti oxidant will be used.

It is possible in other embodiments of the invention that other acids in the organic peroxide family, or other chemical compositions could be used instead of Peracetic Acid or in combination therewith and still amply perform, e.g., blends of Peracetic Acid with octanoic acid or with decanoic acid or both or with other percarbonic acids. The Peracetic Acid may be used along with other percarbonic acids, peracids, hydrogen peroxide, or other components such as percarbonate, perborate, or other components or either alone or in combination. Although Peracetic Acid has been used in all the examples disclosed herein, its exclusive use should not be considered limiting unless otherwise specified in the claims.

It is believed that the addition of Peracetic Acid would have usefulness for numerous applications if introduced in concentrations from about 1 ppm to about 100 ppm, from about 1 ppm to about 250 ppm, from about 1 ppm to about 2500 ppm, from about 1 ppm to about 10 ppm and from about 3 ppm to about 5 ppm, depending on the exact details of the system 10 and 100 and the milk product treated. The smaller the volume of food liquid treated by PAA, such as in the semi continuous addition, the higher the concentration of PAA can be especially if the oxidizing components of the milk or food liquid are being paused to go through the pasteurizer or reduced during the injection of the PAA, which is within the scope of this invention as it has been mentioned before in this document. Also, in some embodiments, the portion of milk that has been treated with PAA with or without the other chemical elements is diverted to the reservoir 46 (under control of the valves V0 or V23), which allows even higher concentration of PAA to be used. Indeed, the milk can then be stored for a longer time to allow neutralization of the PAA and either disposed of in another process, such as an animal feed process or an evaporation process, or reinjected in the systems 10 and 100.

US Patent application publication 20100075006 describes a use of PAA in the food processing industry. However, in this document, PAA in low concentration is intended for long contact with the whey to maintain acceptable level of bacteria and more specifically the pathogenic bacteria *Escherichia Coli* below 10 cfu/ml as the whey goes through the different membranes. The method doesn't use any anti-oxidant to neutralize the residual activity of the oxidizer and allow much longer contact of the oxidizer with the product. PAA and Hydrogen Peroxide residual being low decomposes with time.

The second part of the present invention is to start immediately the neutralization process as soon as the mixture of microbiological control agent and milk reaches the discharge of the pasteurizer, the neutralization process being then immediately initiated by doing a metered or micro metered addition of at least one food grade or processing aid anti-oxidant using at least another metering or micro metering pump. The anti-oxidant is introduced by ratio into the milk flow in sufficient amount to insure further complete neutralization of the residual concentration of oxidizer(s) for further process. The ratio and concentration to be used may be determined with analytical testing.

In alternative embodiments, the anti-oxidant(s) can instead be added by ratio into each pasteurized tank just before or during its filling with pasteurized product (the volume of anti oxidant to be added is determined with analytical testing and calculated as a ratio to the volume of pasteurized product to be contained in each pasteurize tank along with the residual concentration of oxidizer to be neutralized). Proper automation in some embodiments can also confirm both quantities of oxidizer and anti-oxidant to be completed.

In other alternative embodiments, the anti-oxidant(s) can also be added by ratio by hand into each pasteurized tank when starting to be filled with pasteurized product. Again, the volume of anti-oxidant to be added is determined with analytical testing and calculated based on the volume of product to be sent to the tank along with the residual concentration of oxidizer to be neutralized.

In another embodiment wherein the oxidizer is added semi continuously or by batch, any milk ingredient (fat, WPC, MPC, sweet cream, whey cream) that can be oxidized by the presence of the oxidizer is stopped being added or even removed from the milk during the addition of the oxidizer until it has been neutralized. Then only, the milk ingredients are added again, for a certain period of time, at a higher ratio until the proper ratio has been reached again. This addition is performed at a moment and location such that the milk ingredient is substantially unaffected by the microbiological control agent.

Furthermore, in some embodiments, the milk product includes dissolved oxygen and the method includes removing at least part of the dissolved oxygen so that the amount of anti-oxidant needed is minimized.

The following is a list summarizing many non-limiting variants of the present invention.

The proposed method can be used to better pasteurize milk, but it can also be used for any food or food supplement or food additive or pharmaceutical or medicinal or probiotic based liquid. Non-limiting examples of products treated with the proposed method include milk or a mixture of milk and other ingredients to produce finish milk products such as yogurt, cheese, quark, fermented milk, sour cream, ice cream; or vegetable milk based made with soy, or rice or a mixtures thereof with other ingredients to produce finish pasteurized soy, rice of vegetable based milk based products, fermented based soy, rice of vegetable based milk products, frozen soy, rice of vegetable based products; liquid egg products; beer, wine, juice, or soft drink; tea or coffee drinks; or a mixture thereof.

The microbiological control agent can include one oxidizer or a combination of different oxidizers. In some embodiments, the microbiological control agent can be made of at least one oxidizer with at least one non oxidizer chemical all food processing aids or food grade additive making their combination effective to kill and remove the attached bacteria and the associated biofilms When the microbiological control agent and/or the sanitizing agent include many substances, these substances can be added simultaneously, at a single location, or at different locations in the systems 10 and 100.

Typically, the microbiological control agent and the neutralizing agent are food grade approved, or food processing aid approved, or approved sanitizer with direct food contact.

In some embodiments, the microbiological control agent includes a microbiological control element selected from the group consisting of peracetic acid, octanoic acid, decanoic acid, a percarbonic acid, a peracid, hydrogen peroxide, percarbonate, perborate, a peroxycarbonic acid, sodium carbonate peroxyhydrate, sodium perborate, ozone, acetic acid, an organic acid, an inorganic acid and chlorine dioxide. In some embodiments of the invention, the Peracetic Acid is synthesized on site from its basic constituents (water, hydrogen peroxide and acetic acid). In some embodiments, the microbiological control agent includes a surfactant approved as a food processing aid or a food additive to increase the penetrating properties of the microbiological control agent on the interior surfaces of the pasteurizer into the deposited organic matter and into the biofilms. The food processing aid surfactant or combination of surfactants can also be added separately into the milk flow at its own ratio at the same time of the addition of the oxidizer for the same benefits as cited just above.

The microbiological control agent is injected into the food liquid product to be pasteurized. In some other embodiments, the microbiological control agent is injected into at least one of the ingredients that is stored prior its addition into the pasteurizer or when being pumped or fed into the pasteurizer flow or into the balance tank of the pasteurizer. Non limitative example of milk ingredients used in the pasteurization of milk for cheese making: Whole Whey, Condensed Whey, Whey Protein Concentrate, Whey Protein Isolate, Whey Cream, UF milk, Milk Protein Concentrate, Non Fat Dairy Blend, Sweet Cream or any other ingredient that could be added into the pasteurizer for that process.

In some embodiments, the milk product is used in a fermentation process downstream of the first location 5, the fermentation process being performed at a fermentation temperature, the first location being a location at which a temperature of the milk product is within about 20° C. of the fermentation temperature. In other embodiments, the milk product is bottled downstream of the second location 7 at a bottling temperature, the first location 5 being a location at which a temperature of the milk product is within about 20° C. of the bottling temperature. It is advantageous to control microorganisms at a specific temperature in a heat exchanger that may contaminate the milk product downstream of the heat exchanger when the milk is then stored for a relatively long duration at the specific temperature.

In some embodiments, the oxidizer is introduced in the systems 10 and 100 with the presence of the cream in the milk in order to kill at least partially the attached bacteria and remove at least partially the associated biofilms and also to oxidize to a desired level the cream in order to give a specific desired rancid taste as well as the other functions of the process. In other embodiments, during the introduction of the oxidizer in the systems 10 and 100, the cream continues to be separated from the milk and that cream is evacuated out of the circuitry so no fat is in the milk in order to prevent unnecessary oxidization of the fat. The fat may then be added later into the pasteurizer in a higher ratio to achieve desire level per batch as soon after the injection of oxidizer has been completed.

In some embodiments, the injection of other milk ingredient(s) such as, non limitatively, whole whey, whey protein, whey protein concentrate, whey isolate, whey cream, UF milk, milk protein concentrate, non fat dairy blend, sweet cream, and any other ingredient is stopped prior the injection of the oxidizer to minimize the effect of the oxidizer on those ingredients; and/or to minimize the neutralizing effect of these ingredients on the oxidizer; and/or to minimize the content of organic compounds in the milk so the oxidizer is not neutralized as much by a lowered content of organic matter so the reaction of the oxidizer and its effect on the internal surfaces of the pasteurizer is maximized.

In any process that requires the addition of calcium chloride in the recipe such as cheese making for example, the calcium chloride is injected in a pipe in the milk flow by ratio normally at the discharge of the pasteurizer with a metering or micro metering pump or right into the vat. In some embodiments, the calcium chloride is injected in a pipe in the milk flow by ratio device just beside the injection of the oxidizer at the same time of the injection of the oxidizer in order to increase the killing effect of the surviving flowing and attached bacteria as calcium chloride is known as having anti microbial properties. In this embodiment, combining both chemicals into the milk flow provides a stronger killing effect than when added separately (in cheese making, calcium chloride is not added into the milk for anti microbial purposes).

In some embodiments, in the making of fermented products such as in the system 100, the oxidizer is added for a duration that represents filling the fermentation tank until 1 second up to 600 seconds or more if needed before the starter or bio culture is added in the fermentation tank. Then injection of oxidizer is stopped for the rest of the fermentation fill. Indeed, any presence of oxidizer in the vat when the starter or bio culture is added must be neutralized with the action of the anti-oxidant added so the starter culture can grow without any interference at its optimal rate and produce cheese or any other fermented product. It is desired to inject oxidizer into the smallest possible volume of less milk and have the lowest possible contact time in order to minimize oxidizing reaction of the proteins and the cream, if present. In this application, since the oxidizer is not added to the volume of the fermentation tank, it becomes an advantage to add more oxidizer in less milk and provide a stronger impact and reaction on the surviving attached bacteria and biofilms. In some other embodiments of the invention, the oxidizer is added continuously and the addition of the anti-oxidant is also done continuously so it is capable of neutralizing all oxidizing activity in order to ensure proper fermentation.

In some other embodiments of the invention, both injection of oxidizer and anti oxidant during their injection are confirmed by proper automation so the method works normally. If one of the two chemical stops being injected, the other one injection stops immediately and an alarm is turned on so the operator is advised of the problem.

In some embodiments, as soon as the mixture of milk and oxidizer reaches the discharge of the pasteurizer, a sample of that mixture is taken at that point and analytical testing is performed on that sample to determine the residual concentration of oxidizer in the milk and also determine exactly how much anti oxidant needs to be added to neutralize the oxidizer residual. This testing is done especially during the development and start up stage of the method but can also be performed at different times during the production to make sure the method works consistently.

In some embodiments, the introduction of the oxidizer or anti-oxidant, if added in a pipe, is followed by the use of a static mixer pipe device, or any other mixing device, to ensure fast and proper mixing with the milk, and, in the case of the anti-oxidant, to improve neutralization.

In some embodiments of the invention, the neutralizing agent includes a neutralizing element selected from the group consisting of ascorbic acid, calcium ascorbate, calcium bisulphite, calcium citrate, calcium lactate, calcium metabisulphite, calcium phosphates, calcium sulphite, calcium thiophosphate, calcium thiosulfate, citrate acid, citric acid, erythorbic acid, potassium ascorbate, potassium bisulphite, potassium citrate, potassium lactate, potassium metabisulphite, potassium phosphates, potassium sulphite, potassium thiosulphate, potassium thiophosphate, sodium ascorbate, sodium bisulphite, sodium citrates, sodium erythorbate, sodium lactate, sodium metabisulphite, sodium sulphite, sodium potassium tartrate, sodium thiosulphate, sodium thiophosphate, catalase and any other suitable neutralizing element. The neutralizing element used depends on the microbiological control agent used and is selected according to the knowledge available to the person skilled in the art.

In some embodiments, at any time prior, during or after the introduction of both oxidizer and anti-oxidant, the milk pH can be adjusted at a desired pH by the addition of food processing aid acid or alkaline chemical in order to increase the killing and removal of the attached bacteria and their associated biofilms.

In some embodiments, before adding the starter culture to start the cheese making process, there is no residual of oxidizer. Tests will have been performed to determine when the starter culture can be added.

In some embodiments, the milk should contain as little oxygen as possible before its introduction into the pasteurizer in order to get optimal performance of the anti-oxidant at neutralizing the oxidizer and also used minimal quantity of anti-oxidant. A vacuum chamber can be used to remove as much oxygen as possible before pumping the milk into the pasteurizer and/or a vacuum chamber can be part of the pasteurizer system or right after.

In some embodiments, the removal or neutralization of the residual oxidizer concentration can be done partially or completely with the use of a vacuum chamber installed in the pasteurizer more preferably upstream the location of the injection of the anti oxidant. In some embodiments, the removal or neutralization of the residual oxidizer concentration can also be done partially or completely with the use of a hydro dynamic cavitation device installed into the pasteurizer or at the discharge of the pasteurizer. Hydro dynamic cavitation is known for its degazing properties and also to produce micro bubbles that can reach inside them thousands of Fahrenheit degrees which would accelerate the instability of the oxidizer and consequently increase its oxidization power and consequently increase its efficacy at killing and remove the attached and flowing bacteria and biofilms. At the time, the oxidizer would get degraded faster. The installation of the hydrodynamic cavitation device in the pasteurizer would be more preferably located at the highest temperature point of the pasteurizer i.e. at the discharge of the heating section to provide maximum destruction rate of both the oxidizer and the surviving flowing microorganisms as hydrodynamic cavitation is recognized to also be effective at killing microorganisms. In some other embodiments, the removal or neutralization of the residual oxidizer concentration can be done with a set of the use of any combination of anti-oxidant, vacuum chamber and hydro dynamic cavitation.

In some embodiments, with the addition of the oxidizer, or before or after there can be an addition by ratio into the pipe in the milk flow or in the balance tank (or anywhere near the oxidizer is injected) of a set of at least an alkaline processing aid (or food grade additive) to raise the pH by 0.1 to 6 logs in order to increase the cleaning and sanitizing property of the mixture while it is going through the pasteurizer. The injection of the alkaline processing aid is done, ideally but not necessarily, substantially close to the injection point of the oxidizer with the use of at least a metered or micro metered pump or injection device. Then at the discharge of the pasteurizer, unless the pH is desired to be maintained at that new level, the pH is brought back down by 0.1 to 6 logs with the addition of at least an acid based processing aid (or food grade additive). The injection of the acid processing aid is done, ideally but not necessarily, substantially close to the injection of the anti oxidant or at any other chosen location downstream (after) the injection of the alkaline processing aid with the use of at least a metered or micro metered pump or injection device. It is also within the scope of the invention that the injection of the acid processing aid may be done to bring the pH down to the same original value or to any higher or lower pH value if desired. The result of the cleaning and sanitizing effect is sufficient to run the pasteurization for more hours without having to stop the pasteurization mode and make a short or complete wash. The injection again can also be done on a continuous or semi continuous basis or once or more in the entire production day. In this embodiment, the combination of the alkaline compound with the oxidizer can be done continuously, semi continuously or by batch (any addition of the oxidizer triggers the addition of the alkaline compound and then any addition of the anti oxidant triggers the addition of the acid compound. In this embodiment, ideally but not necessarily, both injections of alkaline and acid compound are done upstream the static mixer pipes if present.

In some embodiments, with the addition of the oxidizer, or before or after, there can be an addition by ratio into the pipe in the milk flow or in the balance tank 38 (or anywhere near the oxidizer is injected) of a set of at least an acid processing aid (or food grade additive) to lower the pH by 0.1 to 6 logs in order to increase the cleaning and sanitizing property of the mixture while it is going through the pasteurizer. The injection of the acid processing aid is done, ideally but not necessarily, substantially close to the injection point of the oxidizer with the use of at least a metered or micro metered pump or injection device. Then at the discharge of the pasteurizer, unless the pH is desired to be maintained at that new level, the pH is brought back up by 0.1 to 6 logs with the addition of at least an alkaline processing aid or food grade additive. The injection of the alkaline processing aid is done, ideally but not necessarily, substantially close to the injection point of the anti oxidant or at any other chosen location downstream (after) the injection of the acid processing aid with the use of at least a metered or micro metered pump or injection device. It is also within the scope of the invention that the injection of the alkaline processing aid may be done to bring the pH back up to the same original value or to any higher or lower pH value if desired. The result of the cleaning and sanitizing effect is sufficient to run the pasteurization for more hours without having to stop the pasteurization mode and make a short or complete wash. The injection again can also be done on a continuous or semi continuous basis or once or more in the entire production day. In this embodiment, the combination of the acid compound with the oxidizer can be done continuously, semi continuously or by batch (any addition of the oxidizer triggers the addition of the acid compound and then any addition of the anti oxidant triggers the addition of the alkaline compound). In this embodiment, ideally but not necessarily, both injections of acid and alkaline compound are done upstream the static mixer pipes if present.

In some embodiments, with the addition of the oxidizer, there can be an addition of at least a chelating processing aid and/or a dispersing processing aid (or food grade additive) in order to increase for the most part the cleaning properties of the oxidizer. The chelating agent is added by ratio into the pipe in the milk flow or in the balance tank (or anywhere near the oxidizer is injected) with the use of at least a metered or micro metered pump or injection device as close as possible, but not necessarily, to the injection point of the oxidizer. If the chelating agent has to be neutralized, the neutralization process would take place by ratio in a pipe into the milk flow ideally, but not necessarily, as close as possible to injection point of the anti oxidant with the use of at least a metered or micro metered pump to inject the neutralizing agent. It is important to note here that the words 'chelating agent' and 'dispersing agent' used in this document could be replaced without any limitation by the words emulsifying agent, or conditioning agent, or detergent, or by any other words or chemicals that would mean to help increasing the cleaning and/or the sanitizing properties of the oxidizer into the food fluid flow while in production mode.

In some embodiments, with the addition of the oxidizer, there can be an addition of at least a wetting agent processing aid (or food grade additive) in order to increase the cleaning and/or sanitizing property. The wetting agent is added by ratio into the pipe in the milk flow or in the balance tank (or anywhere near the oxidizer is injected) with the use of at least a metered or micro metered pump or injection device as close as possible, but not necessarily, to the injection point of the oxidizer. If the wetting agent has to be neutralized, the neutralization process would take place by ratio in a pipe into the milk flow ideally, but not necessarily, as close as possible to injection point of the anti oxidant with the use of at least a metered or micro metered pump. Non limitative example of wetting agent and its neutralizer is ionic, or cationic or nonionic or amphoteric or polyhydric wetting agent or a combination thereof. It is important to note here that the words 'wetting agent' used in this document could be replaced without any limitation by the words surface acting agent, or surfactant, or penetrating agent, or surface tension reducing agent, or softening agent or emulsifying agent or solubilizing agent or foaming agent or defoaming wetting agent or any other words that would mean to help penetrating or push the oxidizer or any other chemical into the biofilm and/or onto the surface to be cleaned and sanitized while in production mode.

The alkaline processing aid may be composed of any of the following food processing aid or food grade additive chemicals, all together or separately within more than one product: Sodium hydroxide, potassium hydroxide, calcium hydroxide, magnesium hydroxide, any alkaline phosphate based chemical, any silicate based chemical, any carbonate based chemical, any sulfate based chemical, any polyacrylate based chemical, any enzyme, any oxidizing agent(s), anti-oxidant agent(s) and any other alkaline chemicals that can be approved as processing aid or food grade additive and can contribute to the cleaning and/or sanitizing at least partial of the pasteurizer while in pasteurizing mode for more hours without having to stop production and wash or short wash the pasteurizer. In some embodiments, an oxidizing agent is part of the alkaline chemical formula if injected as the cleaning boost and/or the main cleaning agent. In some embodiments, an anti-oxidant agent is part of the alkaline material if the alkaline material is used to neutralize the acidic cleaning and sanitizing (oxidizer) mixture The chelating processing aid may be composed of any of the following food processing aid or food grade additive chemicals: Any alkaline phosphate based chemical, any phosphonate based chemical, any organic based chelating chemical, any polyacrylate based chemical, any gluconate based chemical, any EDTA based chemical and NTA based chemical and any other chelating or dispersing compound that can be approved as food processing aid or food grade additive and can contribute to the cleaning and/or sanitizing at least partial of the pasteurizer while in pasteurizing mode and allow to run the pasteurizer in pasteurization mode for more hours without having to stop production and wash or short wash the pasteurizer.

The wetting agent processing aid chemical may be composed of any anionic, cationic, non ionic, amphoteric, defoaming, foaming, polymeric surfactants or any other wetting agent that can be approved as food processing aid and can contribute to the cleaning and/or sanitizing of the pasteurizer while in pasteurizing mode and allow to run the pasteurizer in pasteurization mode for more hours without having to stop production and wash or short wash the pasteurizer.

The acidic food processing aid chemical may be composed of any inorganic and/or inorganic acid that can be approved as food processing aid. The acid may contain also, within the formula or separately, some other components such as wetting agents, enzymes, oxidizing agents, antioxidant agents and any other components that can be also approved as food processing aid or food additive and contribute to the cleaning and/or sanitizing. In some embodiments, an oxidizing agent is part of the acid based chemical formula if injected as the cleaning boost and/or main cleaning agent. In some embodiments, an anti-oxidizing agent is part of the acid based chemical formula if the acid material is used to neutralize the alkaline cleaning and sanitizing (oxidizer) mixture.

In some embodiments, the oxidizer or the sanitizer used is acidic to the point that its injection lowers or increases the pH significantly by more than 0.05 log requiring that the neutralization process not only neutralizes the oxidizer but also the pH drop or increase. In such case, the neutralization process requires the addition of an anti oxidant with an alkaline or acidic processing aid or a anti oxidant that contains an alkaline or acidic buffering agent. In some embodiments, less than 0.05 pH log changes may request neutralization with an alkaline or acidic buffering agent.

In some embodiments, the method can also use at least one sanitizer that doesn't have any oxidizing property, approved as a food additive, or as food processing aid, or as preservative, or as sanitizer with direct food contact, which sanitizer is added to kill microorganisms and at the same time, an oxidizer is also added in order to mainly breakdown the biofilms attached (may also provide some killing). In such scope, both the non oxidizing sanitizer and the oxidizer may be neutralized with a sanitizer neutralizer and the appropriate anti-oxidant at the discharge of the pasteurizer or in the vessel, tank, silo or vat where the milk is going into.

In some embodiments, the method can also use of a mixture of oxidizer(s), and/or with or without non oxidant sanitizer(s), and/or with or without oxidizer(s) with no anti-microbial property, and/or with or without alkaline compound(s), and/or with or without chelating agent(s), and/or with or without wetting agent(s), and or with or without acid compound(s) all being approved as food grade additive, or food processing aid and injected with an injection device or pump for each chemical, if used separately, by ratio upstream the pasteurizer in at least a location which can be a pipe into the milk flow coming to the pasteurizer, and/or in a pipe into a milk ingredient flow coming into the pasteurizer, and/or in the balance of the pasteurizer, and/or in a pipe in the milk flow upstream the raw regeneration section, and/or in a pipe in the milk flow upstream the pasteurize regeneration section. Again, they would all be preferably, but not necessarily, neutralized by injection by ratio with the use of their respective injection device or pump in at least a location at the discharge of the pasteurizer in a pipe in the milk flow or in the vessel, tank, silo or vat where the milk is going into with the appropriate food processing aid neutralizer.

In another embodiment, the injection of the different chemicals that can be used (set of oxidizer, sanitizer, alkaline compound, acid compound, chelating agent and wetting agent) to make the cleaning and/or sanitizing, at least partial of the interior surface of a pasteurizer in pasteurizing mode is done by ratio alternatively into the pasteurizer in the pipe in the milk flow upstream the raw regeneration section for a certain time or volume and then follows with a pause of zero to a predetermined number of seconds (or from 0 to a predetermined number of liters of milk) and then switches the injection into another pipe in the milk flow upstream the pasteurize regeneration section for another certain time or another volume. Both injections are done with the use of one injection device or metered or micro metered pump per chemical injection or with one only injection device or one metered or micro metered pump for the two injection location with two directional valves to allow alternating the injection at the two different locations. The neutralization process, of both alternative injections cited above, which injects the neutralizing agents takes place as described before in at least one location between the end of the pasteurize regeneration section and the discharge of the pasteurizer or into the vat, vessel, silo or tank the milk is going into or, more preferably, there are two locations to inject alternatively the anti oxidant and/or the other neutralizing chemicals; downstream the raw regeneration section to neutralize the injection of the chemical(s) performed upstream the raw regeneration section; and secondly at another location downstream the pasteurize regeneration section down to the discharge of the pasteurizer to neutralize every injection performed upstream the pasteurize regeneration section. The benefit of this embodiment is to maximize alternatively a full chemical cleaning and/or sanitizing reaction in only one regeneration section at a time with less contact time with the milk as it gets immediately neutralized at the discharge of the regeneration section. As a non limitative example, this injection can go on and on alternatively into one regeneration and then to other regeneration continuously, or semi-continuously, or from vat fill to vat fill, or alternatively every x vat fill(s). The other benefit is that it minimizes the injection of the chemicals and still provides a sufficient cleaning and/or sanitizing of the pasteurizer so it can remain in pasteurization mode for a longer time without having to stop pasteurization and wash or short wash the pasteurizer. Also by having a shorter exposure time of the chemical(s) with also less milk, less oxidization of the milk constituents is observed. Also, for the same reasons, it is possible to use a maximum concentration of the different chemical(s) in a lot less volume of milk and still achieve a sufficient cleaning and/or sanitizing of the pasteurizer so the pasteurizer remains in pasteurization mode for a longer time without having to stop the pasteurization and wash or short wash the pasteurizer.

In yet another embodiment, the method uses the same method described in the previous item with the difference that the chemistry of cleaning and/or sanitize varies every two alternative injections by using different set of the chemicals.

In another embodiment, the confirmation of the injection and addition of each chemical is performed with the use of a flow meter in each injection line and/or with the use of weight scaling system from a tank feeder system and/or with the use of volume measurement from a tank graduated system.

Although the present invention has been described hereinabove by way of preferred embodiments thereof, it can be modified, without departing from the spirit and nature of the subject invention as defined in the appended claims.

What is claimed is:

1. A method for controlling microbiological contamination in a heat exchanger while using said heat exchanger to process a milk product, said method comprising:
    while processing said milk product in said heat exchanger, intermittently adding a microbiological control agent to said milk product by adding the microbiological control agent at a first location for a first duration of from about 1 s to about 1000 s, wherein no microbiological control agent is added to said milk product after said first duration for a second duration of from about 1 s to about 1200 min; and
    neutralizing at least partially said microbiological control agent by adding a neutralizing agent to said milk product at a second location, said second location being downstream from said first location, at least part of said heat exchanger being between said first and second locations, said neutralizing agent being operative for reducing a chemical reactivity of said microbiological control agent in said milk product;
    wherein said microbiological control agent controls said microbiological contamination in said heat exchanger while said milk product is processed;
    wherein said microbiological control agent includes peracetic acid added in a quantity resulting in a concentration of said peracetic acid in said milk product in said heat exchanger of from about 1 ppm to about 2500 ppm during said first duration.

2. The method as defined in claim 1, wherein said first location is located upstream of said heat exchanger.

3. The method as defined in claim 1, wherein said first location is located in said heat exchanger.

4. The method as defined in claim 1, wherein said second location is located downstream of said heat exchanger.

5. The method as defined in claim 1, wherein said second location is located in said heat exchanger.

6. The method as defined in claim 1, further comprising diverting said milk product in which said microbiological control agent has been added in a reservoir, said second location being said reservoir.

7. The method as defined in claim 1, wherein said milk product is used in a fermentation process downstream of said first location, said fermentation process being performed at a fermentation temperature, said first location being a location at which a temperature of said milk product is within about 20° C. of said fermentation temperature.

8. The method as defined in claim 1, wherein said milk product is bottled downstream of said second location at a bottling temperature, said first location being a location at which a temperature of said milk product is within about 20° C. of said bottling temperature.

9. The method as defined in claim 1, wherein neutralizing at least partially said microbiological control agent includes
measuring said microbiological control agent in said milk product downstream of said first location to obtain a microbiological control agent measurement;
determining a neutralizing agent quantity of said neutralizing agent on a basis of said microbiological control agent measurement; and
adding said neutralizing agent quantity of said neutralizing agent at said second location.

10. The method as defined in claim 9, wherein said neutralizing agent quantity is equal to a quantity required to substantially entirely neutralize said microbiological control agent present at said second location and downstream of said second location.

11. The method as defined in claim 10, further comprising confirming that said microbiological control agent has been substantially entirely neutralized downstream of said second location.

12. The method as defined claim 1, wherein said microbiological control agent is an oxidizer and said neutralizing agent is an anti-oxidant.

13. The method as defined in claim 12, wherein said anti-oxidant includes a calcium ion.

14. The method as defined in claim 1, wherein said microbiological control agent further includes a microbiological control element selected from the group consisting of octanoic acid, decanoic acid, a percarbonic acid, a peracid, hydrogen peroxide, percarbonate, perborate, a peroxycarbonic acid, sodium carbonate peroxyhydrate, sodium perborate, ozone, acetic acid, an organic acid, an inorganic acid and chlorine dioxide.

15. The method as defined in claim 1, wherein said concentration of said peracetic acid in said milk product in said heat exchanger is from about 1 ppm to about 100 ppm.

16. The method as defined in claim 1, wherein said concentration of said peracetic acid in said milk product in said heat exchanger is from about 1 ppm to about 250 ppm.

17. The method as defined in claim 1, wherein said concentration of said peracetic acid in said milk product in said heat exchanger is from about 1 ppm to about 10 ppm.

18. The method as defined in claim 1, wherein said concentration of said peracetic acid in said milk product in said heat exchanger is from about 3 ppm to about 5 ppm.

19. The method as defined in claim 1, wherein said neutralizing agent includes a neutralizing element selected from the group consisting of ascorbic acid, ascorbyl palmitate, ascorbyl stearate, calcium ascorbate, calcium bisulphite, calcium citrate, calcium lactate, calcium metabisulphite, calcium phosphates, calcium sulphite, calcium thiophosphate, calcium thiosulfate, citrate acid, citric acid, dilauryl thiodipropionate, distearyl thiodipropionate, erythorbic acid, potassium ascorbate, potassium bisulphite, potassium citrate, potassium lactate, potassium metabisulphite, potassium phosphates, potassium sulphite, potassium thiosulphate, potassium thiophosphate, sodium ascorbate, sodium bisulphite, sodium citrates, sodium erythorbate, sodium lactate, sodium metabisulphite, sodium sulphite, sodium potassium tartrate, sodium thiosulphate, sodium thiophosphate, sulfur dioxide and catalase.

20. The method as defined in claim 1, wherein said milk product includes fat, said method further comprising removing substantially all said fat from said milk product upstream of said first location.

21. The method as defined in claim 20, further comprising reintroducing at least part of said fat removed from said milk product in said milk product at a moment and location such that said fat is substantially unaffected by said microbiological control agent.

22. The method as defined in claim 1, wherein said microbiological contamination includes a biofilm, said method further comprising at least partially breaking down said biofilm in said heat exchanger using said microbiological control agent.

23. The method as defined in claim 1, wherein said microbiological contamination includes a biofilm, said method further comprising at least partially removing said biofilm in said heat exchanger using said microbiological control agent.

24. The method as defined in claim 1, wherein said microbiological contamination includes attached microorganisms, said method further comprising at least partially removing said attached microorganisms from said heat exchanger using said microbiological control agent.

25. The method as defined in claim 1, wherein said microbiological contamination includes attached microorganisms, said method further comprising killing at least some of said attached microorganisms in said heat exchanger using said microbiological control agent.

26. The method as defined in claim 1, further comprising mixing together said microbiological control agent and said milk product.

27. The method as defined in claim 1, further comprising mixing together said neutralizing agent and said milk product containing said microbiological control agent.

28. The method as defined in claim 1, wherein said microbiological control agent includes a surfactant.

29. The method as defined in claim 1, wherein said milk product includes dissolved oxygen, said method comprising removing at least part of said dissolved oxygen.

30. The method as defined in claim 1, wherein said microbiological control agent includes a microbiological control element selected from the group consisting of a chelating agent, a dispersing agent, an emulsifying agent, a conditioning agent, a detergent, a wetting agent, a surface acting agent, a surfactant, a penetrating agent, a surface tension reducing agent, a softening agent, an emulsifying agent, a solubilizing agent, a foaming agent, a defoaming wetting agent, an acid, a base, sodium hydroxide, potassium hydroxide, calcium hydroxide, magnesium hydroxide, an alkaline phosphate based chemical, a silicate based chemical, a carbonate based chemical, a sulfate based chemical, a polyacrylate based chemical, an enzyme, an oxidizing agent, an anti-oxidant agent a phosphonate based chemical, an organic based chelating chemical, a polyacrylate based chemical, a gluconate based chemical, an ethylenediaminetetraacetic acid (EDTA) based chemical and an enzyme.

31. The method as defined in claim 1, wherein said microbiological control agent is a cleaning agent.

32. The method as defined in claim 1, wherein said microbiological control agent is a sanitizing agent.

33. The method as defined in claim 1, wherein said heat exchanger is part of a system selected from the group consisting of a heat treatment system, a pasteurizer, a thermizer and a High Temperature Short Time (HTST) heating system.

34. The method as defined in claim 1, wherein said microbiological control agent is added to said milk product intermittently on a microbiological tested quality of said milk product.

35. The method as defined in claim 1, wherein said first location is located in a milk product ingredient line going into said heat exchanger.

36. The method as defined in claim 1, wherein said microbiological control agent is chosen from the set of oxidizing and non-oxidizing sanitizing agent.

* * * * *